(12) United States Patent
Shultz et al.

(10) Patent No.: US 7,975,731 B2
(45) Date of Patent: Jul. 12, 2011

(54) METHOD AND APPARATUS FOR EVACUATING AND FILLING TIRES WITH HIGH PURITY NITROGEN

(75) Inventors: Eric I. Shultz, Mount Joy, PA (US); Jeffrey B. Murphy, Millersville, PA (US); Thomas L. Crandall, York, PA (US)

(73) Assignee: RTI Technologies, Inc., York, PA (US)

( * ) Notice: Subject to any disclaimer, the term of this patent is extended or adjusted under 35 U.S.C. 154(b) by 1014 days.

(21) Appl. No.: 11/797,193

(22) Filed: May 1, 2007

(65) Prior Publication Data

US 2008/0271810 A1 Nov. 6, 2008

(51) Int. Cl.
*B65B 31/00* (2006.01)

(52) U.S. Cl. .............................. 141/38; 141/66; 152/415

(58) Field of Classification Search .................. 141/38, 141/65, 66; 152/415
See application file for complete search history.

(56) References Cited

U.S. PATENT DOCUMENTS

| | | | |
|---|---|---|---|
| 4,333,491 A | 6/1982 | Knubley | |
| 4,456,038 A | 6/1984 | Gwaltney et al. | |
| 4,582,108 A | 4/1986 | Markow et al. | |
| 4,640,331 A | 2/1987 | Braun et al. | |
| 4,702,287 A | 10/1987 | Higbie et al. | |
| 4,782,878 A | 11/1988 | Mittal | |
| 5,129,920 A | 7/1992 | Albers et al. | |
| 5,588,984 A | 12/1996 | Verini | |
| 5,611,875 A | 3/1997 | Bachhuber | |
| 5,688,306 A | 11/1997 | Verini | |
| 5,855,646 A | 1/1999 | Verini | |
| 5,857,481 A | 1/1999 | Zimmerman et al. | |
| 5,878,791 A * | 3/1999 | Kane ................................ | 141/59 |
| 5,891,277 A | 4/1999 | Bachhuber | |
| 5,906,227 A * | 5/1999 | Sowry ............................. | 141/65 |
| 5,967,198 A * | 10/1999 | Smalley .......................... | 141/38 |
| 5,992,476 A * | 11/1999 | Sowry ............................. | 141/65 |
| 6,155,313 A * | 12/2000 | Smalley .......................... | 141/38 |
| 6,234,217 B1 * | 5/2001 | Makino et al. .................. | 141/38 |

(Continued)

FOREIGN PATENT DOCUMENTS

JP  2002154410  * 5/2002

(Continued)

*Primary Examiner* — Gregory L Huson
*Assistant Examiner* — Nicolas A Arnett
(74) *Attorney, Agent, or Firm* — Antonelli, Terry, Stout & Kraus, LLP.

(57) ABSTRACT

A method and an apparatus for filling tires with high purity nitrogen involves evacuating and then filling tires with nitrogen. An automated apparatus has a mode of operation which can be selected from among a four tire service, a spare tire service and a top off service, with or without vacuuming during evacuation. With the four tire service, four tires connected to the apparatus are evacuated and then filled to set front and rear tire pressures. With the spare tire service a single tire connected to the apparatus is evacuated then nitrogen filled to a set tire pressure. A five tire service for evacuating and filling two front and two rear tires and a spare tire is also disclosed. The top off service of a tire connected to the apparatus involves sensing the tire pressure and then evacuating or nitrogen filling to obtain a set tire pressure. Evacuation of a tire is automatically stopped when a set minimum pressure level or a set maximum time limit for evacuation is reached. The apparatus permits accurate filling of tires with high purity nitrogen in an efficient manner without requiring the operator to attend the apparatus during the process after initial setup.

13 Claims, 20 Drawing Sheets

U.S. PATENT DOCUMENTS

| | | |
|---|---|---|
| 6,478,852 B1 | 11/2002 | Callaghan et al. |
| 6,612,346 B1 * | 9/2003 | Allen et al. .................. 141/38 |
| 6,892,776 B2 | 5/2005 | Skoff |
| 7,044,176 B2 | 5/2006 | Boni |
| 7,059,372 B1 | 6/2006 | McKoy |
| 7,073,545 B2 | 7/2006 | Smith et al. |
| 7,137,417 B2 * | 11/2006 | Kroll et al. ................ 141/66 |
| 7,174,925 B2 * | 2/2007 | Fritz, II ..................... 141/38 |
| 7,387,659 B2 * | 6/2008 | Roks ........................... 95/22 |
| 7,624,774 B2 * | 12/2009 | Lighter ....................... 141/38 |
| 2004/0211466 A1 | 10/2004 | Saheki |
| 2005/0115633 A1 * | 6/2005 | Kroll et al. ................. 141/65 |
| 2007/0125232 A1 * | 6/2007 | Wrosch et al. ............ 141/38 |
| 2007/0274845 A1 * | 11/2007 | Ruprecht et al. .......... 95/15 |

FOREIGN PATENT DOCUMENTS

| | | | |
|---|---|---|---|
| JP | 2003054918 | * | 2/2003 |
| JP | 2003300710 | * | 10/2003 |
| JP | 2004017955 | * | 1/2004 |

* cited by examiner

METHOD AND APPARATUS FOR EVACUATING AND FILLING TIRES WITH HIGH PURITY NITROGEN

TECHNICAL FIELD

The present invention relates to an improved method and apparatus for filling tires with high purity nitrogen.

BACKGROUND

Methods and apparatus for automotive tire inflation with air are known. Examples are found in U.S. Pat. Nos. 4,333,491; 4,456,038; 4,702,287; 4,782,878; 5,611,875; and 5,891,277.

In known methods and apparatus for automotive tire inflation with air, where tires are simultaneously filled with air, typically, all four tires are filled simultaneously from a single air source. Valve stems at the tire are typically very imprecise devices. Access to the interior of a tire is restricted, to a varying degree, based on the relative position of the valve core in the valve stem and the valve core depressor on the filling device. A problem that can occur is that the tires may not all be equally pressurized as a result of the varying valve stem restrictions.

The advantages of using nitrogen rather than air for tire inflation for improved safety, longer tire life, and therefore less cost, have been recognized. Apparatus and methods to intermittently manufacture and dispense nitrogen for use in product manufacturing processes or for tire inflation have been proposed in U.S. Pat. Nos. 5,588,984; 5,688,306; and 5,855,646, for example. In these known apparatus, compressed air enters a nitrogen module containing a permeable membrane that selectively separates nitrogen from the air and discharges oxygen and other gases. The nitrogen gas then flows into a vessel for storage. In U.S. Pat. No. 5,588,984, a means for vending the nitrogen gas from the apparatus allows customers to financially activate the apparatus to obtain a desired amount of nitrogen gas which can be dispensed to a tire to be filled by way of flexible hoses and an air chuck. There is a need for an improved method and apparatus for filling tires with nitrogen in an accurate and efficient manner and which enable simultaneous filling of all four tires of a vehicle so that they are equally pressurized with high purity nitrogen.

SUMMARY

The apparatus for filling tires with nitrogen of the invention comprises means for separating nitrogen from pressurized air, a container for storing pressurized nitrogen separated from pressurized air by the means for separating, an evacuation passage for evacuating gas from tires, at least one outlet for connection with a tire, and at least one valve selectively communicating the evacuation passage and the container with the at least one outlet for respectively evacuating gas from and nitrogen filling a tire connected to the outlet. In two disclosed embodiments, the apparatus further comprises means for creating a vacuum in the evacuation passage for evacuating gas from a tire connected to the outlet. The tire is preferably drawn into a vacuum prior to charging with pressurized nitrogen so that it will contain nitrogen at a greater purity level than a tire which was at atmospheric pressure prior to filling.

The means for creating a vacuum according to the disclosed embodiments includes a venturi which creates a vacuum in the evacuation passage using pressurized air supplied to the venturi. By way of at least one additional valve of the apparatus the means for separating nitrogen and the venturi are selectively communicated with a supply of pressurized air. Where evacuation by venting to atmosphere rather than under vacuum is desired, the venturi acts as a vent to atmosphere for pressurized gas in the evacuation passage when pressurized air is not supplied to the venturi. In one embodiment of the invention, for manual operation, a vacuum relief valve is provided in communication with the evacuation passage. The vacuum relief valve opens to vent the evacuation passage to atmosphere at a maximum vacuum level.

An automatic apparatus for filling tires with nitrogen according to a second embodiment of the invention further comprises a pressure sensor for sensing the pressure of gas being evacuated from and pressurized nitrogen being supplied to a tire connected to the at least one outlet, and a controller responsive to the pressure sensed by the pressure sensor for operating at least one valve for the evacuating and nitrogen filling a tire connected to the outlet. During evacuation of a tire, the controller stops communication of the evacuation passage with at least one outlet upon the occurrence of at least one of the sensed pressure reaching a minimum pressure level and the time of evacuating the tire reaching a maximum time limit. A data entry terminal of the apparatus permits entry of a pressure as the minimum pressure level and a time limit as the maximum time limit. The apparatus permits the operator to select whether evacuation is to be by vacuum, in which case the minimum pressure level is a set maximum vacuum level, or by venting to atmosphere in which case the minimum pressure level is a minimum pressure limit set by the operator. During evacuating a tire, as the pressure sensed by the pressure sensor approaches the minimum pressure level, the controller periodically pauses the evacuating to allow a static pressure to be sensed by a pressure sensor.

During nitrogen filling a tire connected to the outlet of the apparatus, the controller stops communication of the container with the at least one outlet at a set tire pressure entered by the operator at the data entry terminal during setup. As the sensed pressure approaches the set tire pressure, the controller periodically pauses the nitrogen filling to allow static pressure to be sensed by the pressure sensor for accurate filling.

The disclosed automatic apparatus for filling tires with nitrogen has a plurality of outlets for connection with respective ones of a plurality of tires, and a plurality of valves operable by the controller for selectively communicating the container and the evacuation passage with respective ones of the plurality of outlets. The controller operates the valves for simultaneously evacuating and simultaneously nitrogen filling a plurality of tires connected to the plurality of outlets. These features permit a four tire service to be performed by the apparatus where four tires are connected to respective outlets of the machine and evacuated and nitrogen filled. A further embodiment is also disclosed for five tire service wherein a spare tire can be simultaneously serviced with two front and two rear tires.

When simultaneously evacuating a plurality of tires, as the sensed pressure approaches a minimum pressure level, the controller operates the valves to stop communication of the evacuation passage with each of the plurality of outlets, each outlet then being sequentially communicated with the evacuation passage to allow pressure sensing at the corresponding outlet and evacuating of the tire connected to the outlet to a set minimum pressure level. When simultaneously nitrogen filling a plurality of tires, as the sensed pressure approaches a set tire pressure, the controller operates the valves to stop communication of the container with each of the plurality of outlets, each outlet being then being sequentially communicated with the container to allow pressure sensing at the corresponding outlet and nitrogen filling of the tire connected to the outlet to a set tire pressure. During setup, different pressures may be set for the front tires and the rear tires of a vehicle for both the minimum pressure level during evacuation and the tire pressure for filling.

In addition to a four tire service, the operator of the apparatus can select a spare tire service wherein a single tire is connected to an outlet of the machine and evacuated and nitrogen filled. A top off service is also available for selection by the operator wherein the tire pressure of a tire connected to an outlet of the machine is sensed and one of evacuated and nitrogen filled to obtain a set tire pressure. Upon completion of the automatic evacuating and nitrogen filling of a tire or four tires with the apparatus and according to the method of the invention, the operator is alerted by a buzzer on the apparatus sounding and/or by the use of a remote module which receives a signal from the controller. These and other features and advantages of the apparatus, the method and a machine-readable medium containing of at least one sequence of instructions that, when executed, causes the nitrogen tire filling machine of the invention to operate in accordance with the invention, will become more apparent from the following detailed description of embodiments when considered with the accompanying drawings.

DETAILED DESCRIPTION

Figure 1:
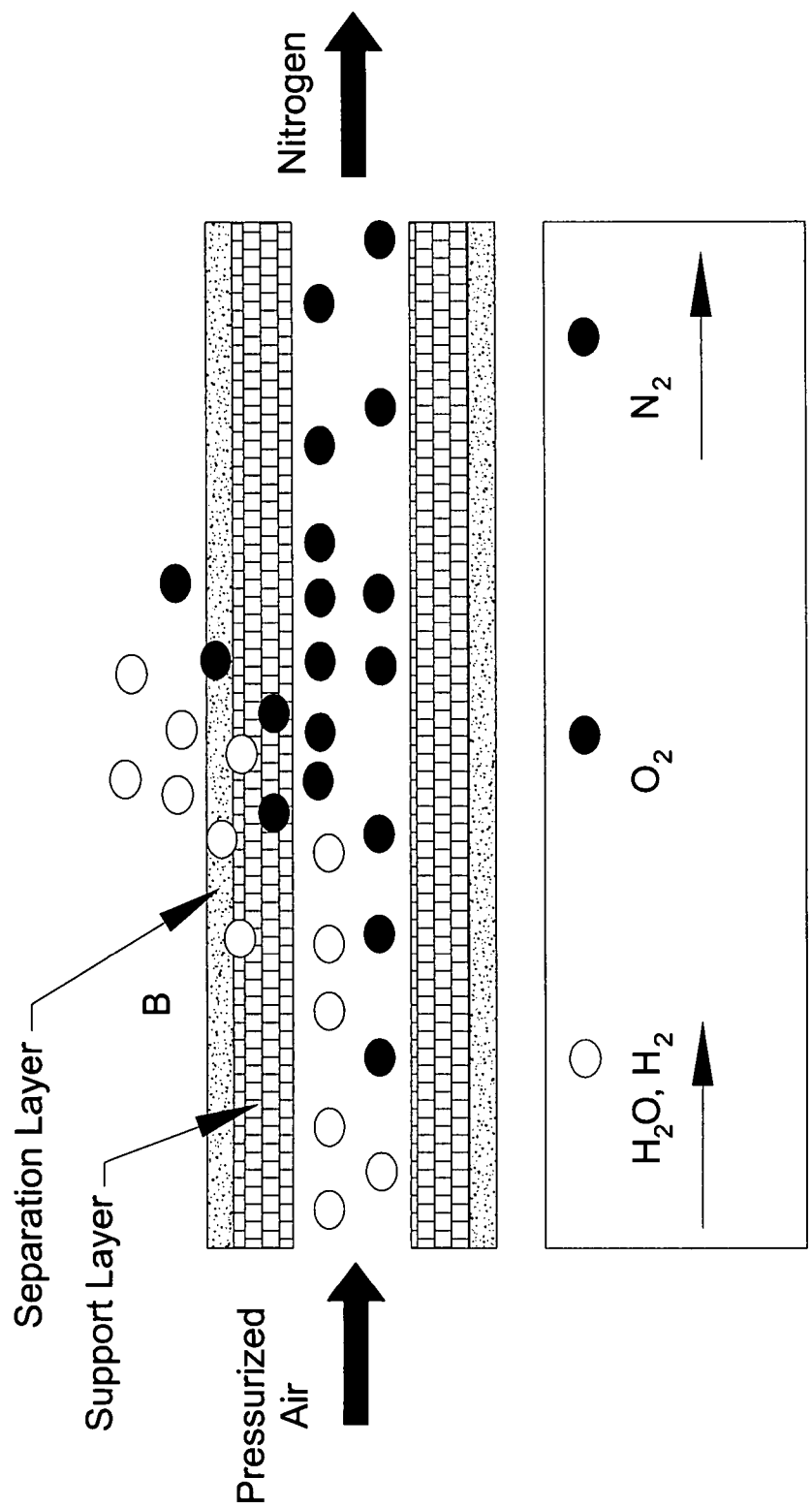
FIG. 1 is a schematic illustration of a permeable membrane used in the apparatus and method of the invention, the drawing showing the flow of pressurized air to the membrane and the separation of nitrogen from other air components by the membrane for use in filling tires according to the invention.
Figure 2:
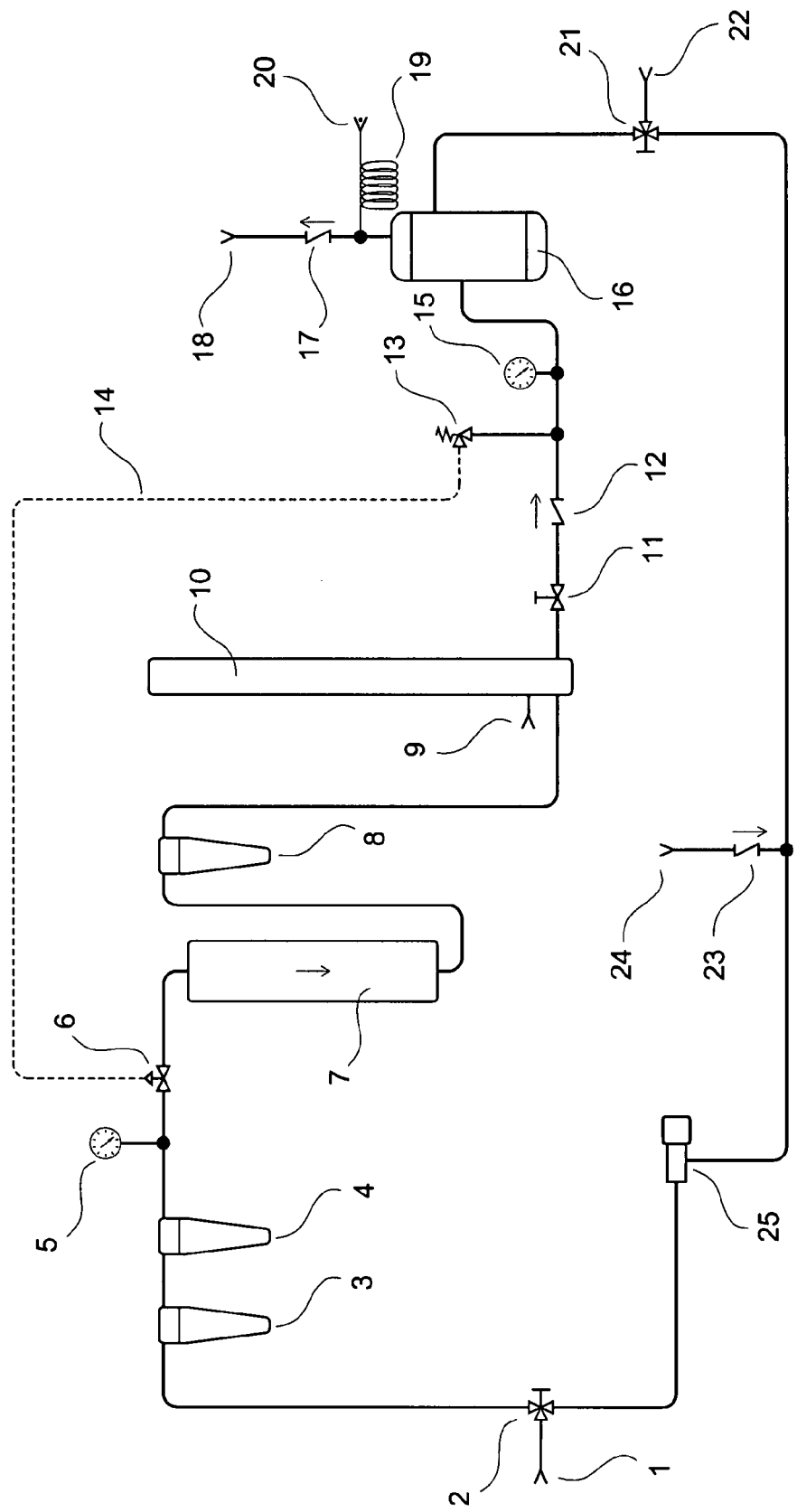
FIG. 2 is a flow diagram and schematic illustration of a manual nitrogen tire filling machine according to a first embodiment of the invention.
Figure 3:
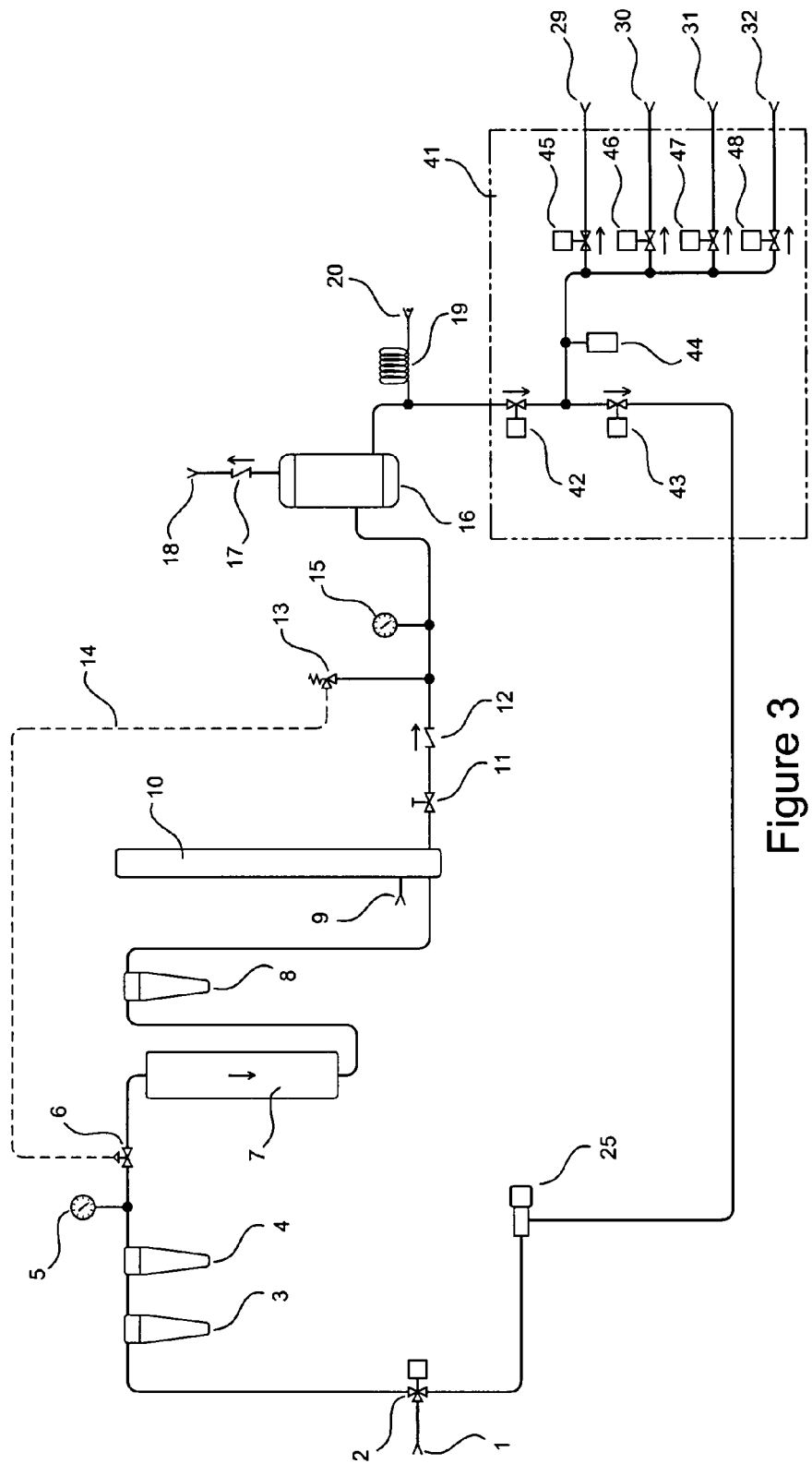
FIG. 3 is a flow diagram and schematic illustration of an automatic nitrogen tire filling machine of a second embodiment of the invention.

Referring now to the drawings, the nitrogen tire filling machine or apparatus of the invention, in each of the disclosed embodiments comprises a membrane 10 to which pressurized air is supplied, see FIGS. 2 and 3. Nitrogen is separated from the other components of the pressurized air within the membrane. The separated nitrogen is then stored in a storage tank 16 for use in filling tires in accordance with the invention as discussed hereinafter. FIG. 1 schematically illustrates the flow of the pressurized air entering the membrane and the nitrogen being separated from the other components in the air and flowing onward as indicated by the arrows and notations in the drawing. An example of the membrane which can be used in the apparatus is disclosed in U.S. Pat. No. 5,129,920, but the invention is not limited to using this one type of nitrogen producing module. Other nitrogen separating materials and technology could be employed.

The manual nitrogen tire filling machine of FIG. 2 has an inlet 1 which is connected to regulated shop air from a compressor. A two position ball valve 2, when turned to a first, fill tire/standby position directs the pressurized air from the compressor to a water separator 3. When the valve is turned to a second, vacuum tire position the compressed air is directed to a venturi 25 within the machine. With the valve 2 in the first position, water in the compressed air directed to the water separator 3 is removed from the air by the water separator. From there the air flows to an oil separator 4 where oil is removed from the air. A pressure gauge 5 indicates the pressure of the air supply. This gauge is mounted on the control panel of the machine for viewing by the operator. The air then flows through a pilot valve 6. The function of the pilot valve is described hereinafter. The compressed air then flows to a carbon filter 7 where hydrocarbons are removed. The air then flows to a moisture separator 8 where moisture is removed from the air.

Pressurized air from the moisture separator 8 flows to the membrane 10 where nitrogen is separated from the other components of the pressurized air as referred to above and as illustrated in FIG. 1. The oxygen in the membrane is vented through the oxygen vent 9. Nitrogen flows from the membrane to a needle valve 11 shown in FIGS. 2 and 3. The flow of nitrogen is restricted by the needle valve. This restriction is a requirement for the membrane to produce nitrogen at a high purity level. The nitrogen then flows to a check valve 12 which prevents nitrogen from flowing in a reverse direction. After the check valve there is a path forward to either a pressure switch 13 or the storage tank 16. A nitrogen pressure gauge 15 indicates the pressure of nitrogen in the storage tank.

Pressure is allowed to increase in the storage tank to a predetermined level. This predetermined pressure level is what the pressure switch 13 is set for. When the pressure switch senses this pressure it changes state, e.g. opens and routes pressure to the pilot valve 6 via the dotted line 14. This pressure activates the pilot valve which closes the flow path of the pressurized air from the oil separator 4. This creates a back pressure to the shop air inlet 1. The back pressure will cause a pressure switch on the shop air compressor to shut off. Without this control, the membrane 10 would continually vent all of the excess shop air through the oxygen vent 9.

The storage tank 16 has a pressure relief valve 17 which is connected to a vent 18. The vent prevents over pressurizing the storage tank. A capillary tube 19 is connected from the storage tank to a nitrogen purity test port 20. The operator can connect a purity tester to this port to determine the purity level of the nitrogen.

The storage tank in the embodiment of FIG. 2 is connected to a three position outlet valve 21. Turning the outlet valve to a first, fill tire position will route pressurized nitrogen from the container to an outlet 22 of the machine. During non-use, the outlet valve is turned to a second, standby position. The outlet valve is turned to a third, vacuum tire position for a procedure of evacuating air from a tire connected to the outlet 22. The nitrogen tire filling machine has the capability of drawing a vacuum on the tire connected to the outlet. The vacuum is produced using the above-mentioned venturi 25 and shop air supplied to the venturi from the inlet 1 via the valve 2. A tire drawn into a vacuum prior to charging with nitrogen will contain nitrogen at a greater purity level than a tire which was at atmospheric pressure.

For vacuuming a tire, regulated shop air is connected to the inlet 1 as described above. The two position valve 2 is turned to the vacuum tire position which directs the air to the venturi 25. The venturi creates a vacuum in the evacuation passage/line connected to the three position outlet valve 21. The vacuum will be drawn on the outlet port 22 when the valve 21 is in the vacuum tire position. This vacuum will deflate the tire by evacuating the air in the tire through the evacuation passage/line. Connected to this line is a vacuum relief valve 23. The vacuum relief valve will open when a set vacuum level is sensed. When the vacuum relief valve opens, the vacuum created by the venturi will be drawn through the vent port 24. This prevents drawing a vacuum on the tire connected to the outlet 22 below the setting of the vacuum relief valve.

The nitrogen tire filling machine of FIG. 2 facilitates the operator individually vacuuming tires and then filling them with high purity nitrogen. However, wait time by the operator during these processes could be better utilized by the operator if the process were performed automatically by the machine. Automation of the tire vacuuming and filling processes in accordance with the invention is accomplished with the second embodiment of the invention shown in FIGS. 3-6 wherein like or similar parts are referenced with the same reference numerals used in describing the machine of FIG. 2.

The automatic nitrogen tire filling machine of the embodiment of FIG. 3 includes a manifold 41 with four hose outlets/outlet ports 29, 30, 31 and 32. In use, one of four hoses, not shown, is independently connected to each of the tire valve stems of four tires to be filled. The other end of each hose is connected to a respective outlet of the manifold in the nitrogen tire filling machine. Solenoid valves 45, 46, 47 and 48 are connected to the manifold to independently open and close respective ones of the flow paths for the nitrogen gas to each of the four outlets and hoses and the tires connected thereto.

Control of pressurized air to the machine and nitrogen flow within the automatic nitrogen tire filling machine is accomplished by the activation of electrical solenoid valves in lieu of manual valves of the previous embodiment as discussed in more detail below. Electrical outputs from a digital electronic controller 63, FIG. 5, activate the solenoid valves based on logic software of a programmed processor such as a microprocessor of the controller. Data from a pressure transducer/sensor 44 is input to the controller to provide pressure data for the process.

Figure 4:
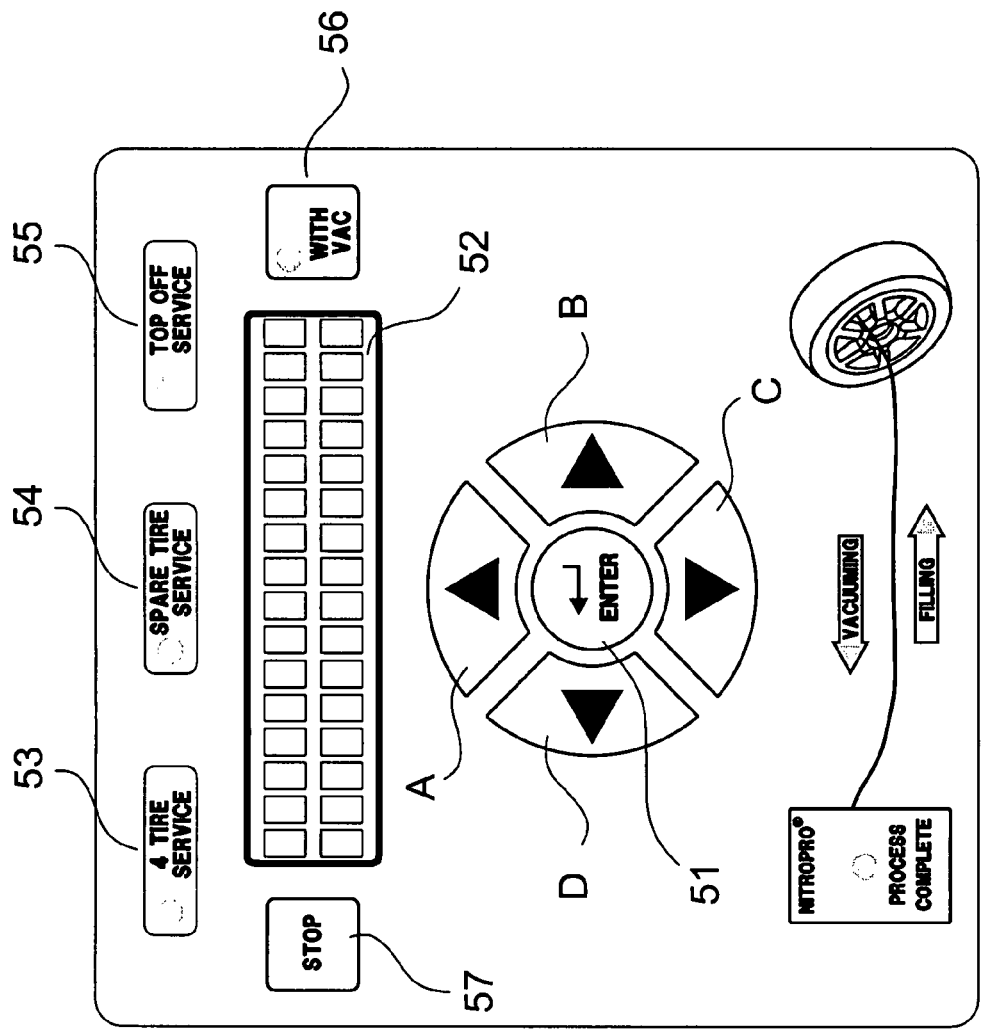
FIG. 4 is a top plan view of a control panel of the automatic nitrogen tire filling machine of FIG. 3.

A liquid crystal display (hereinafter LCD) 52 communicates process activities as well as prompts the operator to input information by pressing buttons on the control panel which is shown in FIG. 4. Units of measure can be selected by the operator during a setup routine. Also, various languages can be selected during the same setup routine.

Figure 5:
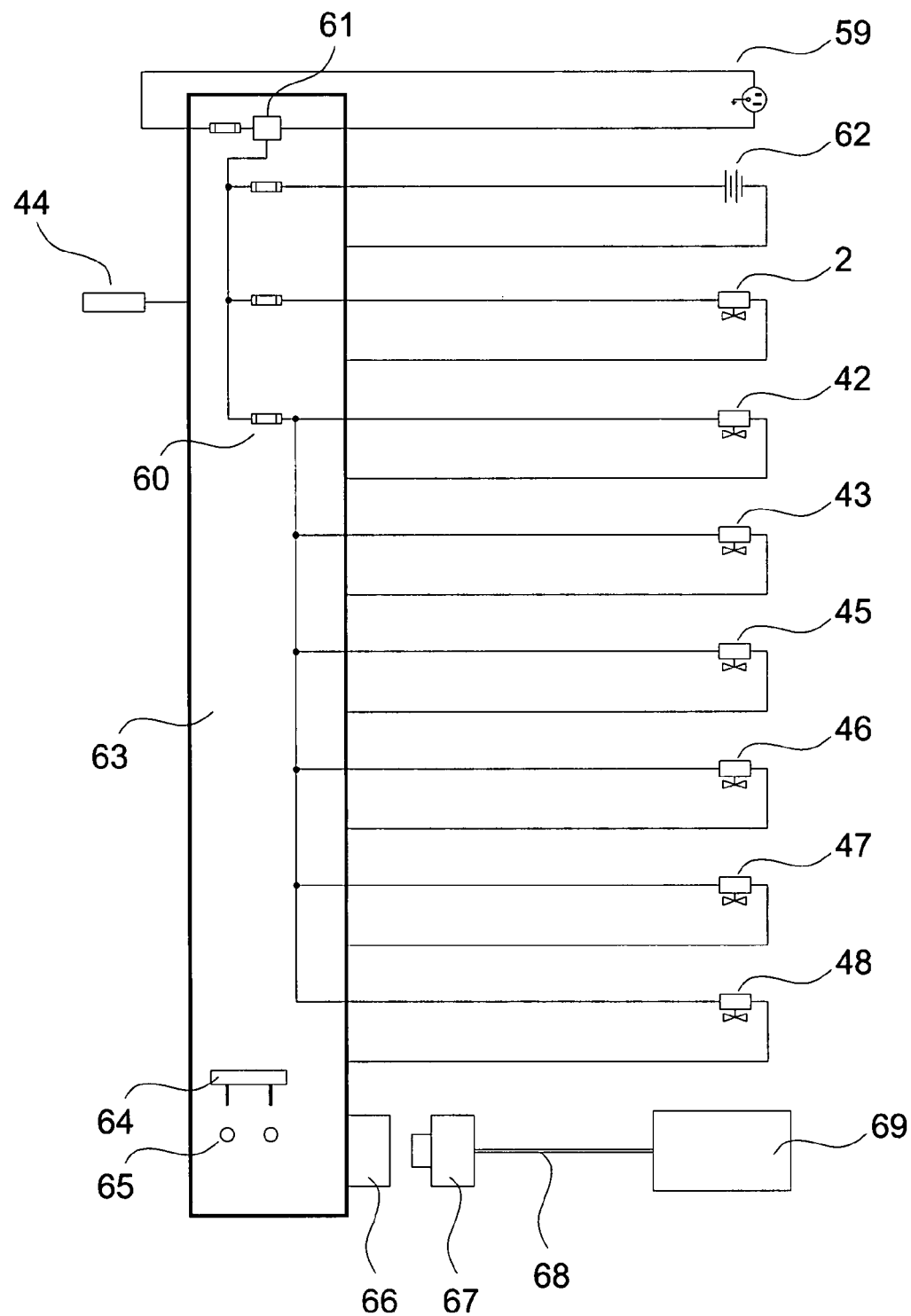
FIG. 5 is an electrical diagram of the automatic nitrogen tire filling machine of FIGS. 3 and 4.
Figure 6A:
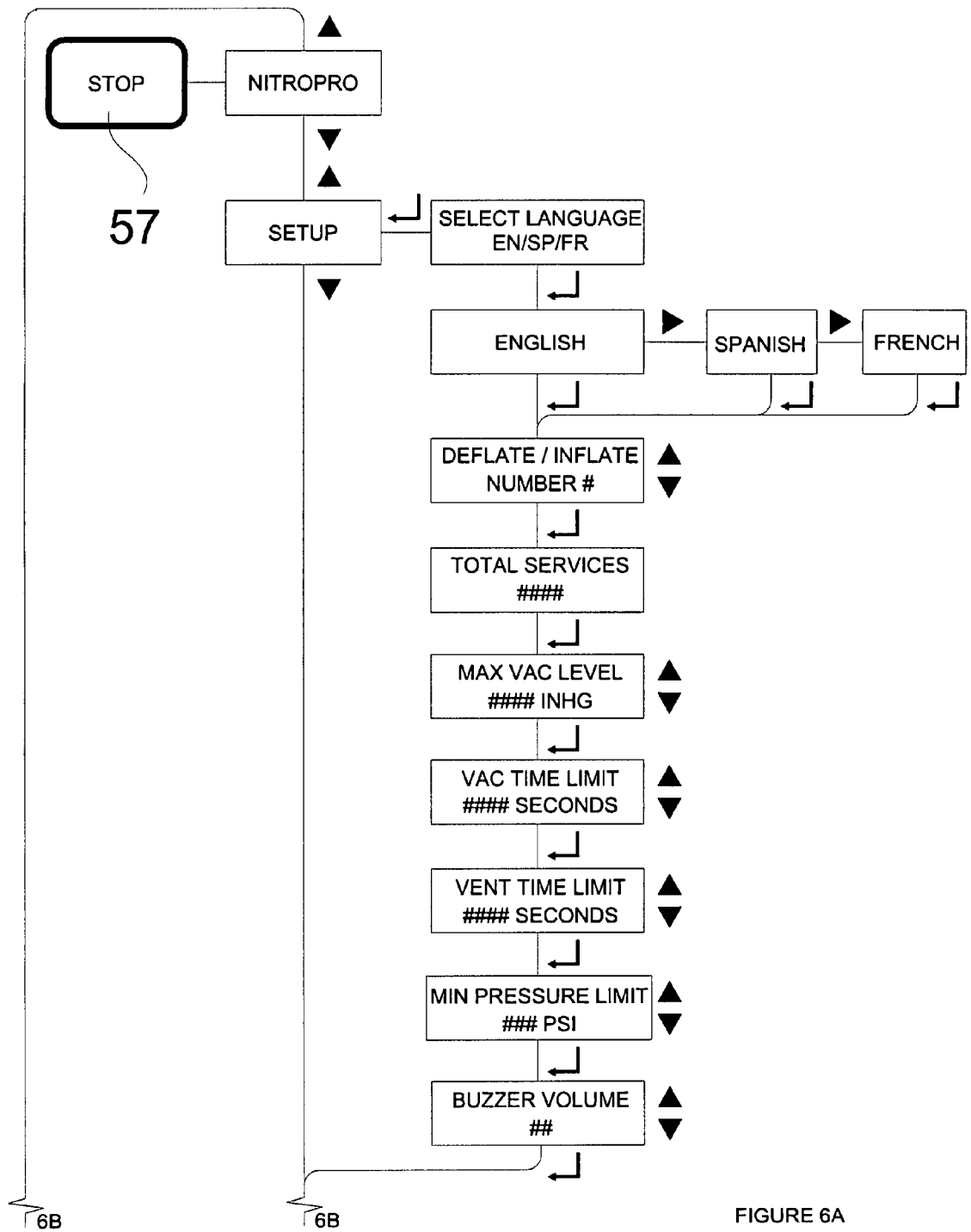
FIGS. 6A-6F are respective portions of a flow diagram illustrating the sequence of operations of the automatic nitrogen tire filling machine of FIGS. 3-5.
Figure 6B:
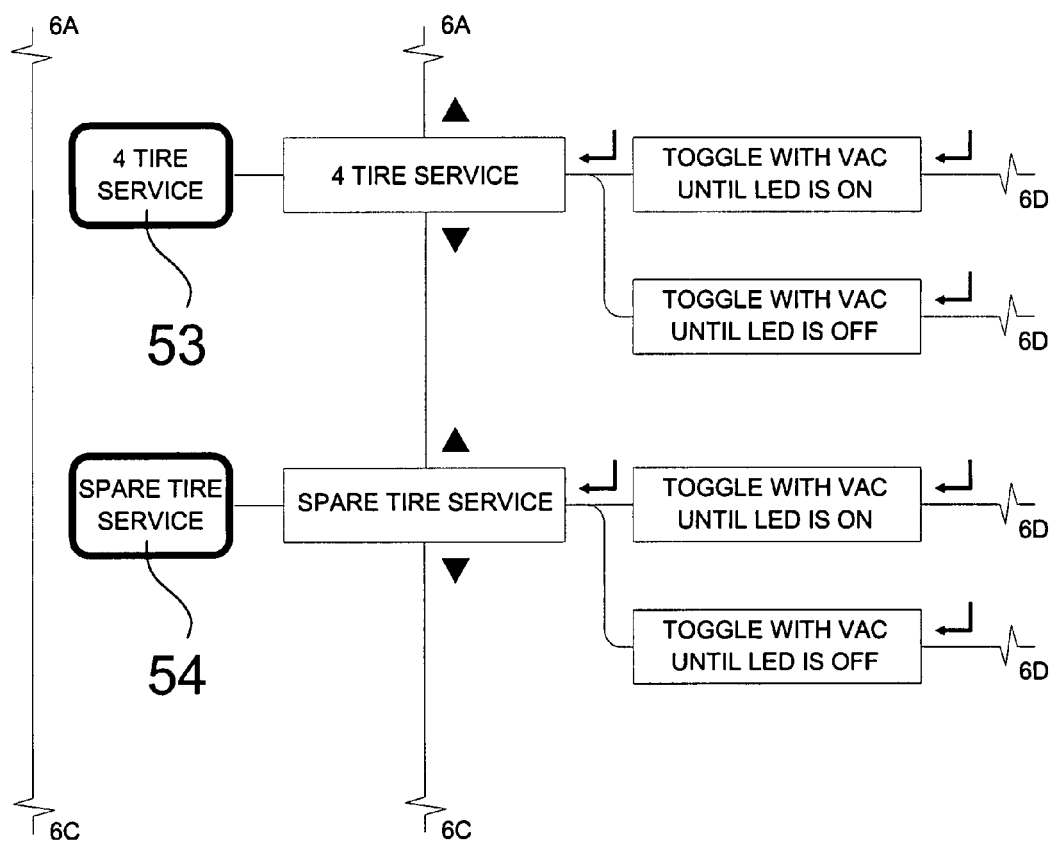
Figure 6C:
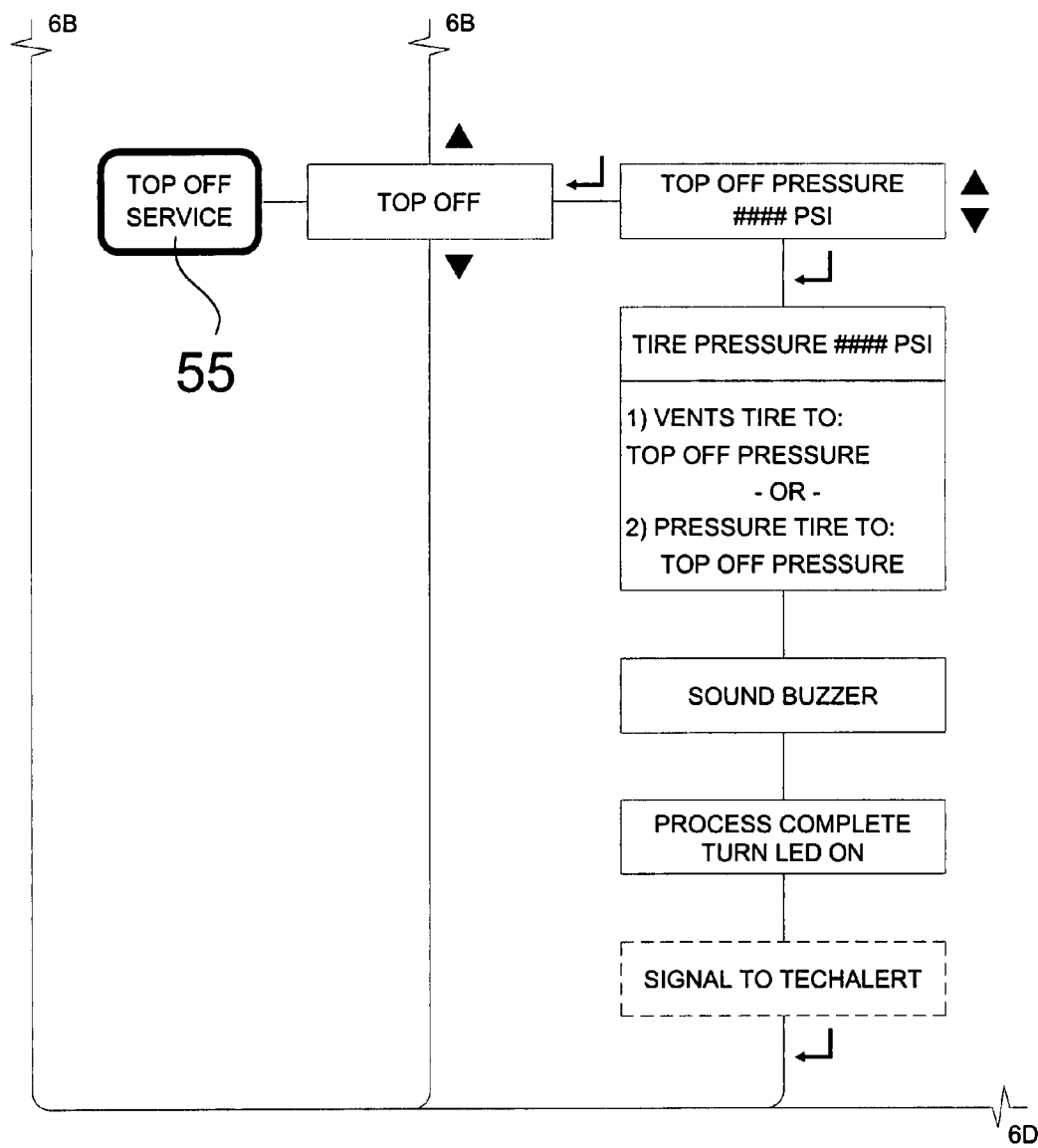
Figure 6D:
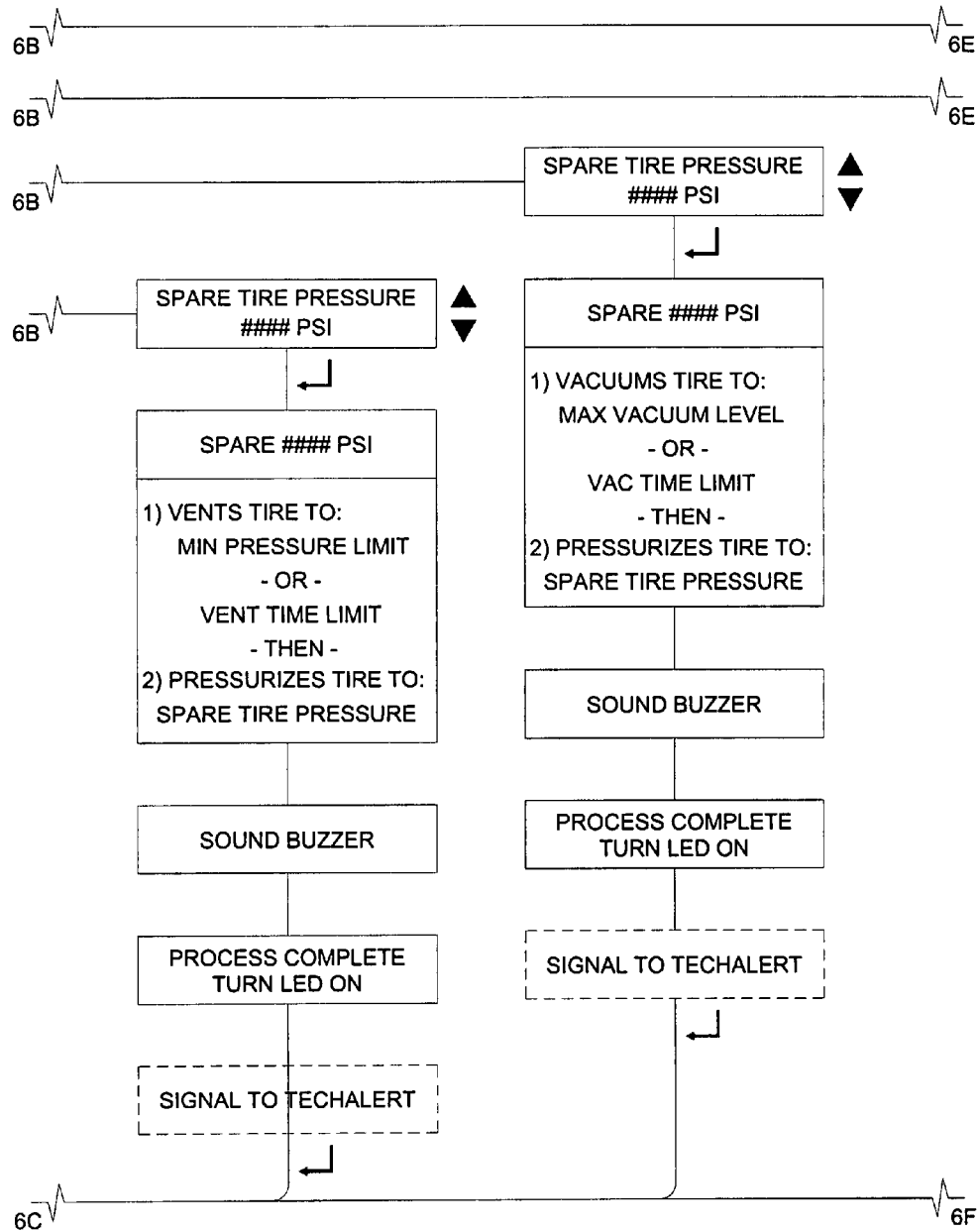
Figure 6E:
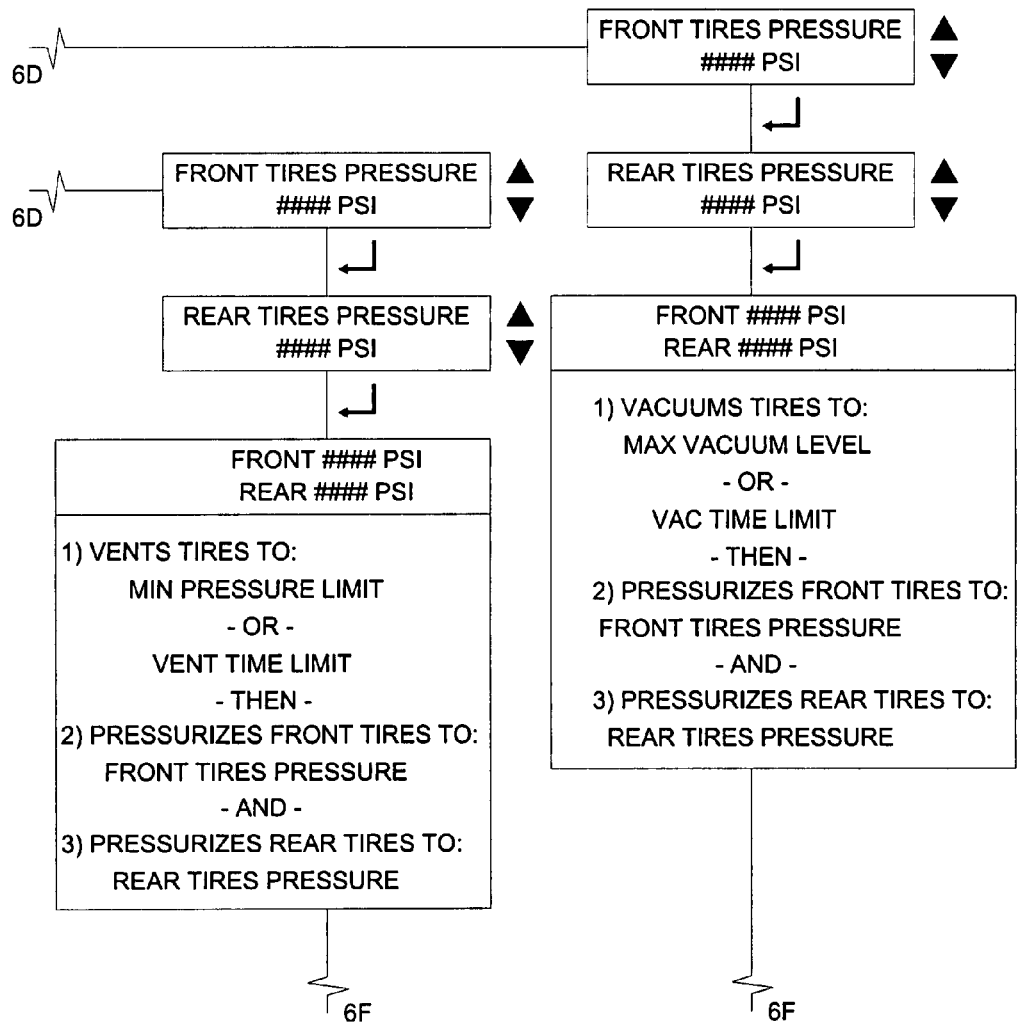
Figure 6F:
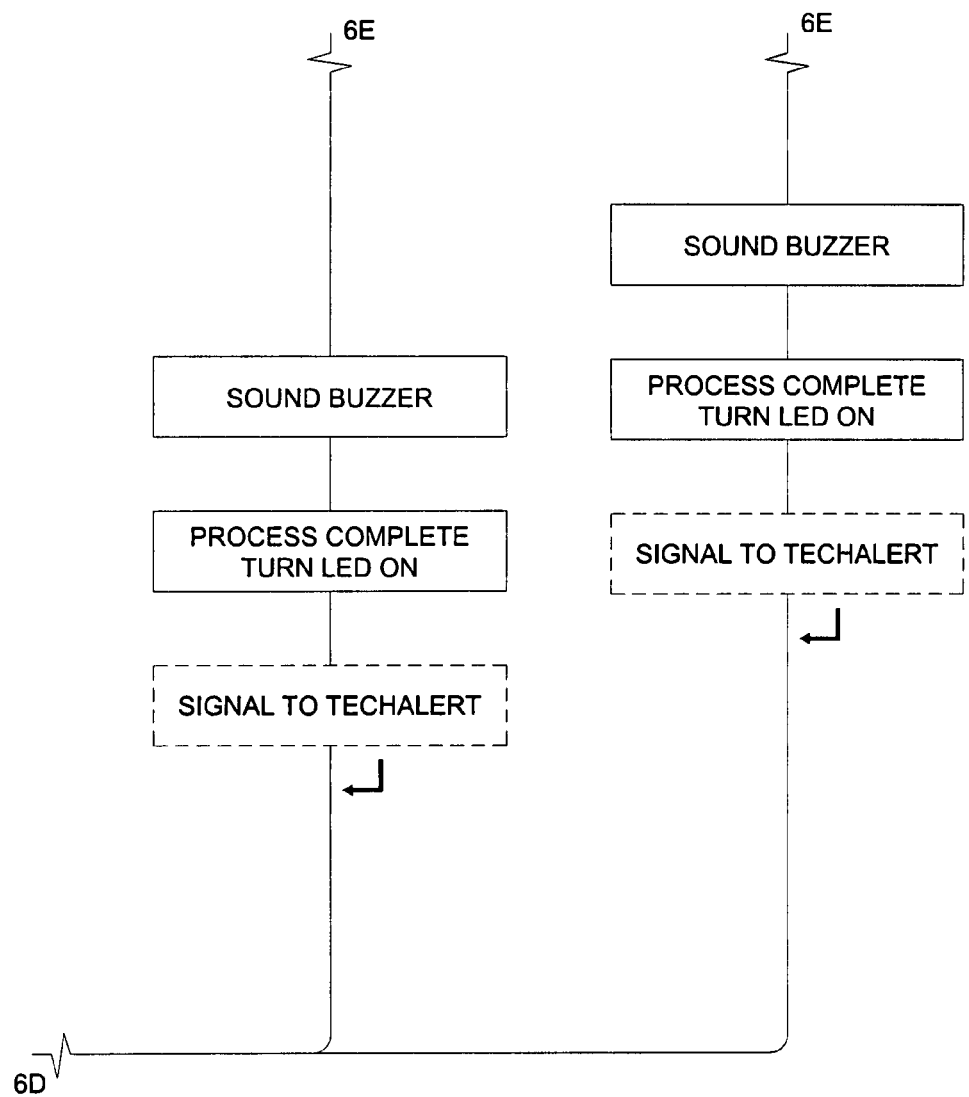

The automatic nitrogen tire filling machine can be operated by connecting the power cord 59, FIG. 5, which is connected to a power supply 61 (85-265 VAC), to normal work shop power (110 or 220 volt alternating current), or by a rechargeable on-board 12 volt direct current battery 62 as shown in FIG. 5. A fuse 60 within the electrical circuit of the machine protects against overloads and surges.

The automatic nitrogen tire filling machine is self contained in one of several possible configurations. One configuration is a permanently mounted storage tank with an integrated control cabinet. A second possible configuration entails a cabinet, which has two large inflated tires on the rear and two swivel casters on the front. This allows flexibility for the operator. The machine can be rolled outside onto the driveway for tire service while in the battery power mode of operation. Other configurations are possible for specific demands of the work shop.

As shown in FIG. 3, like the manual machine of FIG. 2, the automatic nitrogen tire filling machine has an inlet 1 which is connected to regulated shop air. A two position fill tire/vacuum tire solenoid valve 2 directs the shop air to the water separator 3 or the venturi 25. When the controller calls for filling the tires, the fill tire/vacuum tire solenoid directs the air to the water separator 3 where water is removed from the air. From there the air flows to the oil separator 4 where oil is removed from the air. The pressure gauge 5 indicates the pressure of the air supply. This gauge is mounted on the control panel for viewing by the operator. The air then flows through the pilot valve 6 which has a function as described in connection with the embodiment in FIG. 2. The air then flows to the carbon filter 7 where hydrocarbons are removed. The air then flows to the moisture separator 8 where moisture is removed from the air.

The air then flows to the membrane 10 where nitrogen is separated from the pressurized air. Oxygen is vented through the oxygen vent 9. Nitrogen flows from the membrane to the needle valve 11. The flow of nitrogen is restricted by the needle valve. This restriction is a requirement for the membrane to produce nitrogen at a high purity level. The air then flows to the check valve 12 which prevents nitrogen from flowing in the reverse direction. After the check valve there is a path forward to either the pressure switch 13 or the storage tank 16. The gauge 15 indicates the nitrogen pressure in the storage tank. As described previously with reference to the embodiment of FIG. 2, where the pressure switch 13 senses a pressure the switch is set for, it opens and routes pressure to the pilot valve 6 via the passage depicted as a dotted line 14 in FIG. 3. Pilot valve 6 is thereby activated which closes the path from the oil separator 4. A back pressure to the shop air inlet 1 is thus created which will cause a pressure switch on the shop air compressor to shut off. The control avoids the membrane continually venting shop air through the oxygen vent 9 during operation.

The storage tank has a pressure relief valve 17 which is connected to a vent 18 as described with respect to the embodiment of FIG. 2. This prevents overpressurizing the storage tank. The capillary tube 19 connected from the storage tank to the nitrogen purity test port 20 permits the operator to connect a purity tester to determine the purity level of the nitrogen.

The storage tank 16 is connected to the manifold 41 as shown in FIG. 3. The manifold has six electric solenoid valves 42, 43, 45, 46, 47 and 48 mounted and interconnected through pathways through the manifold. The pressure transducer/sensor 44 is also mounted and interconnected through pathways within the manifold. There are appropriate ports on the manifold for connecting incoming and outgoing hoses. Four hose outlets/outlet ports 29, 30, 31 and 32 provide an attachment point for each of the four hoses which are connected to the four tires on a vehicle. Each of the four hoses is labeled—i.e., LF (left front), RF (right front), LR (left rear) or RR (right rear) to indicate to the operator which tire to connect to.

When the controller 63 calls for filling tires, the fill tire solenoid 42 opens. This connects pressurized nitrogen from the storage tank to the pressure transducer 44 and the four outlet solenoids 45, 46, 47 and 48. The controller opens and closes the four outlet solenoids to direct nitrogen to the four outlets. The controller has an input for pressure data from the pressure transducer 44.

The automatic nitrogen tire filling machine of FIGS. 3-6F also has the added capability to draw a vacuum on the four tires. The vacuum is produced using the venturi 25 and shop air. As explained above, a tire drawn into a vacuum prior to charging with nitrogen will contain nitrogen at a greater purity level than a tire which was at atmospheric pressure.

Regulated shop air is connected to the inlet 1. When the controller calls for vacuuming the tires, the fill tire/vacuum tire solenoid 2 opens to direct the shop air to the venturi 25. The venturi creates a vacuum in the evacuation passage/line connected to the vacuum tire solenoid 43. When the controller calls for vacuuming tires, the vacuum tire solenoid 43 also opens. This connects the vacuum to the pressure transducer 44 and the four outlet solenoids 45, 46, 47 and 48.

Several sequences of machine operation are programmed into the controller and can be selected by the operator using the control panel of the machine depicted in FIG. 4. A sequence can be selected by pressing the Enter pushbutton 51 when the LCD 52 is displaying the routine or by pressing the dedicated pushbutton(s), 53, 54, 55 and 56, for the sequence. The various sequences of operation in the example embodiment are described below with reference to FIGS. 4, and 6A-6F.

Setup

The LCD 52 is scrolled, using scroll pushbuttons A and C, until it displays SETUP. The Enter pushbutton is pressed to activate the routine.

The display displays SELECT LANGUAGE EN/SP/FR. The right arrow pushbutton B is used to select the language of choice—English, Spanish or French. The Enter pushbutton is pressed to confirm a choice.

The LCD displays DEFLATE/INFLATE NUMBER=#. The "#" will be the total number of times a tire is deflated and then inflated during a non-vacuum service. The Enter pushbutton is pressed to confirm the choice.

The LCD displays TOTAL SERVICES=####. The "####" will be the total number of services the machine has performed. The Enter pushbutton is pressed.

The LCD displays MAX VAC LEVEL=#### INHG. The "####" is the maximum level of vacuum, expressed in inches of mercury, which will be drawn on a tire during a vacuum routine. Arrow pushbuttons A and C are pressed to increase or decrease "####" value displayed. The Enter pushbutton is pressed to confirm the choice.

The LCD 52 displays VAC TIME LIMIT=#### SECONDS. The "####" is the maximum time a vacuum will be drawn on a tire during any vacuum routine. Arrow pushbuttons A and C are pressed to increase or decrease the "####" value displayed. The Enter pushbutton is pressed to confirm the choice.

The LCD displays VENT TIME LIMIT=####SECONDS. The "####" is the maximum time a tire will be vented to atmosphere during a vent routine. Arrow pushbuttons A and C are pressed to increase or decrease the "####" value displayed. The Enter pushbutton is pressed to confirm the choice.

The LCD displays MIN PRESSURE LIMIT=### PSI. The "###" is the minimum pressure for services performed without vacuuming. Arrow pushbuttons A and C are pressed to increase or decrease the "###" value displayed. The Enter pushbutton is pressed to confirm the choice The LCD 52 displays BUZZER VOLUME=##. Arrow pushbuttons A and C are pressed to increase or decrease the "##" value displayed. The number displayed will be from 0 to 10. The buzzer volume will be off for zero and at maximum volume for 10. The Enter pushbutton is pressed to end the setup sequence.

Four Tire Service with Vacuum

The LCD 52 is scrolled until is shows 4 TIRE SERVICE. The Enter pushbutton is pressed to activate the routine. Or, the dedicated 4 Tire Service pushbutton 53 can be pressed to jump directly to this routine.

The With Vac pushbutton 56 has an indicator light which may or may not be illuminated. For this service, a vacuum is desired, so the toggling pushbutton is pressed until the light illuminates.

The LCD displays FRONT TIRES PRESSURE=#### PSI. Arrow pushbuttons are pressed to increase or decrease the "####" value displayed. The value entered is the pressure that the two front tires will be pressurized to during the nitrogen fill. The Enter pushbutton is pressed to confirm the choice.

The LCD 52 displays REAR TIRES PRESSURE=#### PSI. Arrow pushbuttons are pressed to increase or decrease the "####" value displayed. The value entered is the pressure that the two rear tires will be pressurized to during the nitrogen fill. The Enter pushbutton is pressed to confirm the choice.

The display will display FRONT #### PSI-REAR #### PSI. The #### values will display the actual vacuum or pressure readings in the front and rear tires as the process proceeds.

The process starts by vacuuming all four tires simultaneously. Inlet solenoid 2 will be activated so it is in the vacuum tire position. This will direct ship air to the venturi 25 which will draw a vacuum at the vacuum tire solenoid 43. Solenoids 43, 45, 46, 47 and 48 will be activated and open which will draw a vacuum on the outlet ports 29, 30, 31 and 32 and the tires connected thereto by hoses, not shown.

As the preset maximum vacuum levels on the front and rear tires are approached, the process periodically pauses and a static pressure is read by the controller from pressure transducer 44. Solenoids 45, 46, 47 and 48 are all closed and then each is sequentially opened to give the controller the pressure reading from the pressure sensor, pressure transducer 44, of the corresponding outlet port 29, 30, 31 or 32.

The vacuuming process stops when either the vacuum level in all four tires is at the MAX VAC LEVEL=#### INHG or the time exceeds the VAC TIME LIMIT=#### SECONDS. These two limits are set during the setup routine described above.

The fill tires process then starts. Initially, all four tires are pressurized simultaneously with nitrogen. Solenoids 42, 45, 46, 47 and 48 will be activated and open. Pressurized nitrogen from the storage tank will flow to the outlet ports 29, 30, 31 and 32.

As the preset pressure levels on the front and rear tires are approached, the process periodically pauses and a static pressure is read by the controller from the pressure transducer 44. Solenoids 45, 46, 47 and 48 are all closed and then each is sequentially opened to give the controller the pressure reading of the corresponding outlet port 29, 30, 31 or 32. The fill tires process stops when the front and rear tires are at the pressure levels set above. A buzzer sounds continuously until the operator presses the Enter pushbutton. The signal from the controller which causes the buzzer to sound can instead or additionally be used as an input via jumper 64, receptacle 65 for jumper 64, receptacle 66, plug 67 and cable 68 to stationary module 69 for wirelessly signaling a remote, portable module, not shown, which is described in a concurrently filed, commonly owned U.S. patent application Ser. No. 11/797, 165, the disclosure of which is hereby incorporated by reference.

Four-Tire Service Without Vacuum

The LCD 52 is scrolled until is shows 4 TIRE SERVICE. The Enter pushbutton is pressed to activate the routine. Or, the dedicated 4 Tire Service pushbutton can be pressed to jump directly to this routine.

The With Vac pushbutton has an indicator light which may or may not be illuminated. For this service, a vacuum is not desired, so the toggling pushbutton is pressed until the light is not illuminated.

The LCD displays FRONT TIRES PRESSURE=#### PSI. Arrow pushbuttons are pressed to increase or decrease the "####" value displayed. The value entered is the pressure that the two front tires will be pressurized to during the nitrogen fill. The Enter pushbutton is pressed to confirm the choice.

The LCD displays REAR TIRES PRESSURE=#### PSI. Arrow pushbuttons are pressed to increase or decrease the "####" value displayed. The value entered is the pressure that the two rear tires will be pressurized to during the nitrogen fill. The Enter pushbutton is pressed to confirm the choice.

Next, the LCD will display FRONT #### PSI-REAR #### PSI. The #### values will display the actual vacuum or pressure readings in the front and rear tires as the process proceeds.

The process starts by venting all four tires simultaneously to the atmosphere. Inlet solenoid 2 will be in the fill tire position and therefore not directing shop air to the venturi 25. The venturi will act as an open port.

Solenoids 43, 45, 46, 47 and 48 will be activated and open which allows air from the tires to be evacuated, e.g. vented through the venturi 25 to atmosphere from outlet ports 29, 30, 31 and 32.

As the preset pressure levels on the front and rear tires are approached, the process periodically pauses and a static pressure is read by the controller from pressure transducer 44. Solenoids 45, 46, 47 and 48 all close and then each sequentially opened to give the controller the pressure reading of the corresponding outlet port 29, 30, 31 or 32.

The venting process stops when either the pressure level in all four tires is at the corresponding set MIN PRESSURE LIMIT=### PSI or the time exceeds the VENT TIME LIMIT=#### SECONDS. These two limits are set during the setup routine explained previously.

The fill tires process then starts. Initially, all four tires are pressurized simultaneously with nitrogen. Solenoids 42, 45, 46, 47 and 48 will be activated and open. Pressurized nitrogen from the storage tank will flow to the outlet ports 29, 30, 31 and 32.

As the preset pressure levels on the front and rear tires are approached, the process periodically pauses and a static pressure is read by the controller from pressure transducer 44. Solenoids 45, 46, 47 and 48 are all closed and then each is sequentially opened to give the controller the pressure reading of the corresponding outlet port 29, 30, 31 or 32.

The above deflate and inflate process will repeat up to the number of times entered during the DEFLATE/INFLATE setup routine explained previously. Deflate and inflate target pressures can be independently controlled during a single deflate/inflate service or during multiple deflate/inflate services. A sample multiple deflate/inflate sequence might be to deflate to 0 psi, inflate to tire pressure set above plus 5 psi, deflate to 50 percent of tire pressure set above and inflate to tire pressure set above.

The fill tires process stops when the front and rear tires are at the pressure levels set above. The buzzer in the apparatus sounds continuously until the operator presses the Enter pushbutton. Again, the signal from the controller which causes the buzzer to sound can instead or additionally be used as an input to initiate a signal to a portable module as described in the aforementioned, concurrently filed, commonly owned application for patent.

Spare Tire Service with Vacuum

The operator connects the hose on outlet port 29 to the spare tire.

The LCD 52 is scrolled until it shows SPARE TIRE SERVICE. The Enter pushbutton is pressed to activate the routine. Or, the dedicated Spare Tire Service pushbutton 54 can be pressed to jump directly to this routine.

The With Vac pushbutton 56 has an indicator light which may or may not be illuminated. For this service, a vacuum is desired, so the toggling pushbutton is pressed until the light illuminates.

The LCD 52 displays SPARE TIRE PRESSURE=#### PSI. Arrow pushbuttons are pressed to increase or decrease the "####" value displayed. The value entered is the pressure that the spare tire will be pressurized to during the nitrogen fill. The Enter pushbutton is pressed to confirm the choice.

The display will display SPARE #### PSI. The #### value will display the actual vacuum or pressure reading in the spare tire as the process proceeds.

The process starts by vacuuming the spare tire. Inlet solenoid 2 will be activated so it is in the vacuum tire position. This will direct ship air to the venturi 25 which will draw a vacuum at the vacuum tire solenoid 43. Solenoids 43 and 45 will be activated and open which will draw a vacuum on the outlet port 29.

As the preset maximum vacuum level on the spare tire is approached, the process periodically pauses and a static pressure is read by the controller from pressure transducer 44.

The vacuuming process stops when either the vacuum level in the spare tire is at the MAX VAC LEVEL=#### INHG or the time exceeds the VAC TIME LIMIT=#### SECONDS. These two limits are set during the setup routine described previously.

The fill tire process then starts. As the preset pressure level on the spare tire is approached, the process periodically pauses and a static pressure is read by the controller from pressure transducer 44. The fill tire process stops when the spare tire is at the set tire pressure level. The buzzer sounds continuously until the operator presses the Enter pushbutton. Again, the signal from the controller which causes the buzzer to sound can instead or additionally be used as an input to initiate a signal to a portable module as described in the aforementioned, concurrently filed, commonly owned application for patent.

Spare Tire Service without Vacuum

The operator connects the hose on outlet port 29 to the spare tire.

The LCD 52 is scrolled until it shows SPARE TIRE SERVICE. The Enter pushbutton is pressed to activate the routine. Or, the dedicated Spare Tire Service pushbutton can be pressed to jump directly to this routine.

The With Vac pushbutton has an indicator light which may or may not be illuminated. For this service, a vacuum is not desired, so the toggling pushbutton is pressed until the light is not illuminated.

The LCD displays SPARE TIRE PRESSURE=#### PSI. Arrow pushbuttons are pressed to increase or decrease the "####" value displayed. The value entered is the pressure that the spare tire will be pressurized to during the nitrogen fill. The Enter pushbutton is pressed to confirm the choice.

The LCD will display SPARE #### PSI. The #### value will display the actual pressure reading in the spare tire as the process proceeds.

The process starts by venting the spare tire through the apparatus to the atmosphere. Inlet solenoid 2 will be in the fill tire position and therefore not directing shop air to the venturi 25. The venturi will act as an open port for venting to atmosphere.

Solenoids 43 and 45 will be activated and open which allows air from the tire to vent through the venturi 25 and outlet port 29.

As the preset pressure level on the spare tire is approached, the process periodically pauses and a static pressure is read by the controller from pressure transducer 44.

The venting process stops when either the pressure level in the spare tire is at the MIN PRESSURE LIMIT=### PSI or the time exceeds the VENT TIME LIMIT=#### SECONDS. These two limits are set during the setup routine referred to previously.

The fill tire process then starts. As the preset pressure level on the spare tire is approached, the process periodically pauses and a static pressure is read by the controller from pressure transducer 44. The above deflate and inflate process will repeat up to the number of times entered during the DEFLATE/INFLATE setup routine explained previously.

Deflate and inflate target pressures can be independently controlled during a single deflate/inflate service or during multiple deflate/inflate services. A sample multiple deflate/inflate sequence might be to deflate to 0 psi, inflate to tire pressure set above plus 5 psi, deflate to 50 percent of tire pressure set above and finally inflate to tire pressure set above.

The fill tires process stops when the spare tire is at the pressure level set above. The buzzer then sounds continuously until the operator presses the Enter pushbutton, and/or the signal from the controller which causes the buzzer to sound can be used as an input to a remote module.

Five Tire Service

Figure 7:
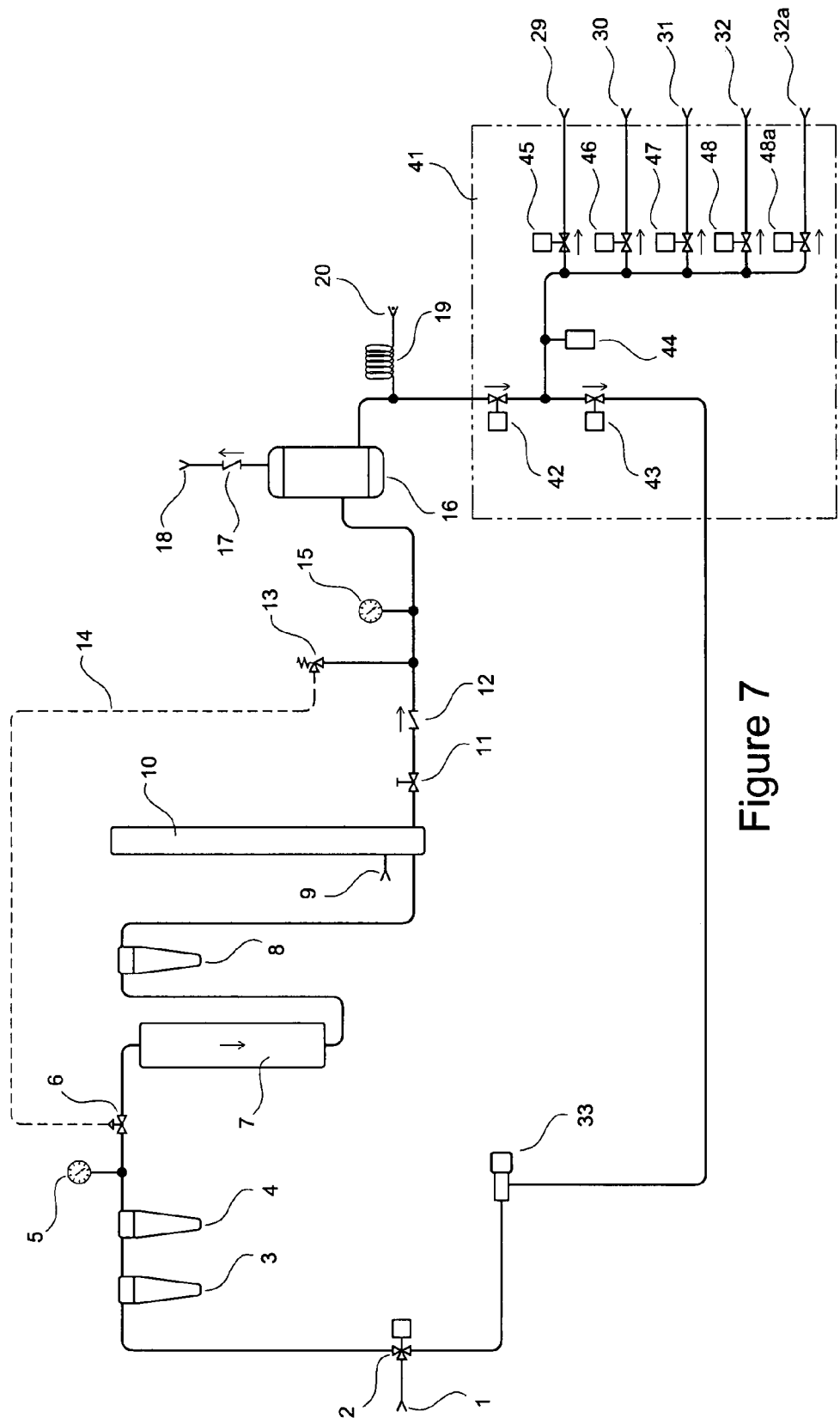
FIG. 7 is a flow diagram and schematic illustration of an automatic nitrogen tire filling machine of a third embodiment which permits a five tire service.
Figure 8:
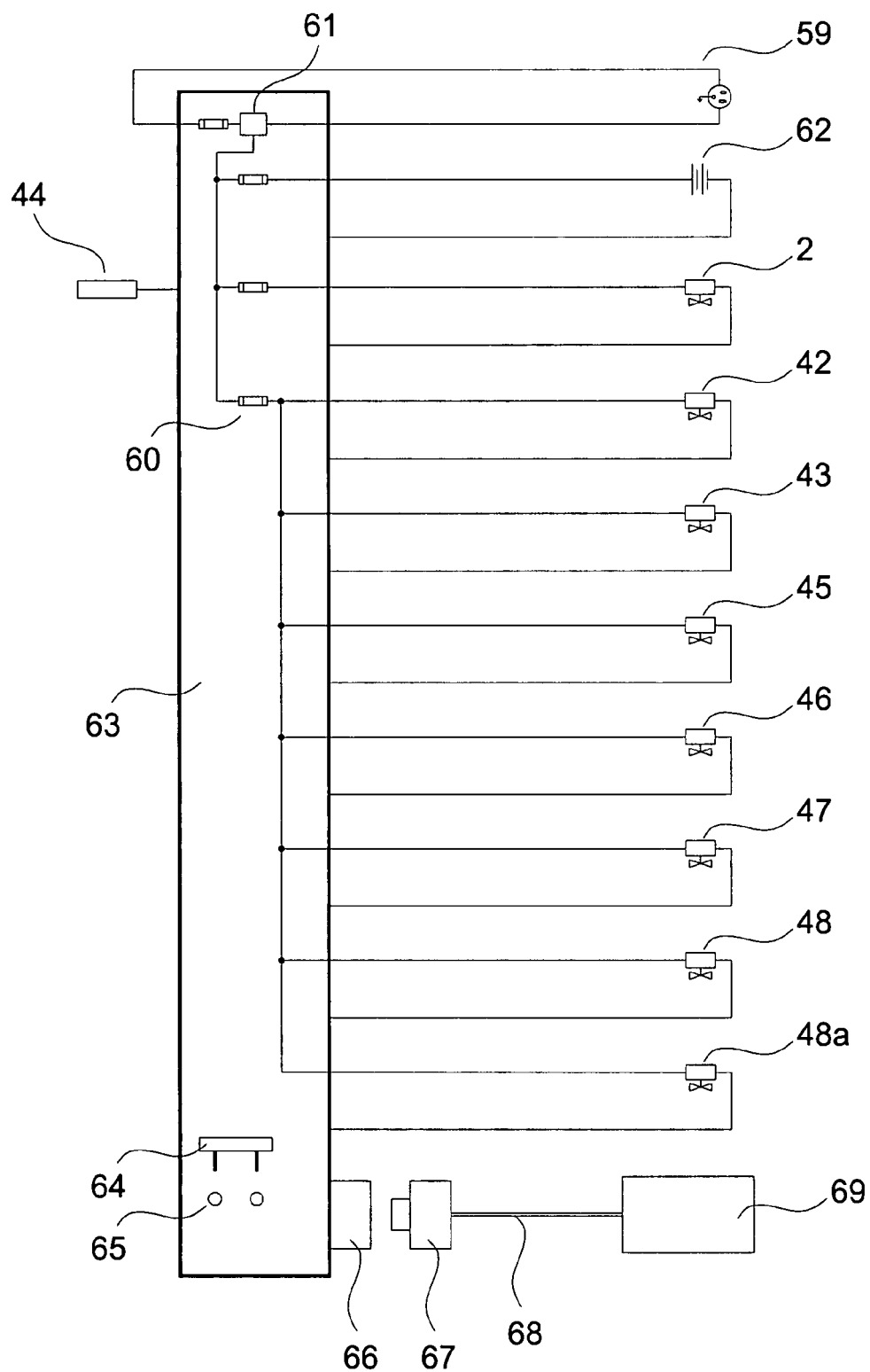
FIG. 8 is an electrical diagram of the automatic nitrogen tire filling machine of FIG. 7.
Figure 9A:
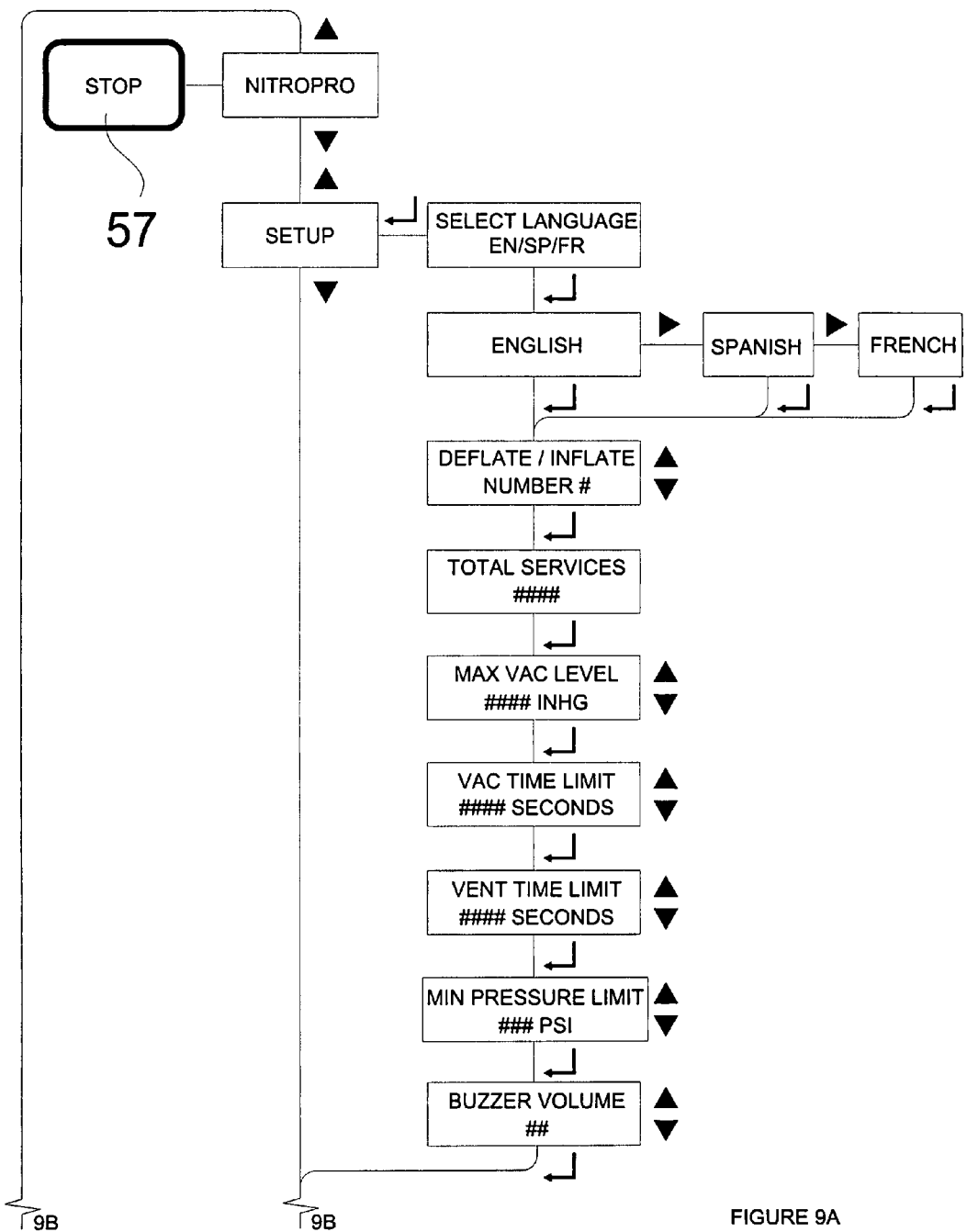
FIGS. 9A-9G are respective portions of a flow diagram illustrating the sequence of operations of the automatic nitrogen tire filling machine of FIGS. 7 and 8.
Figure 9B:
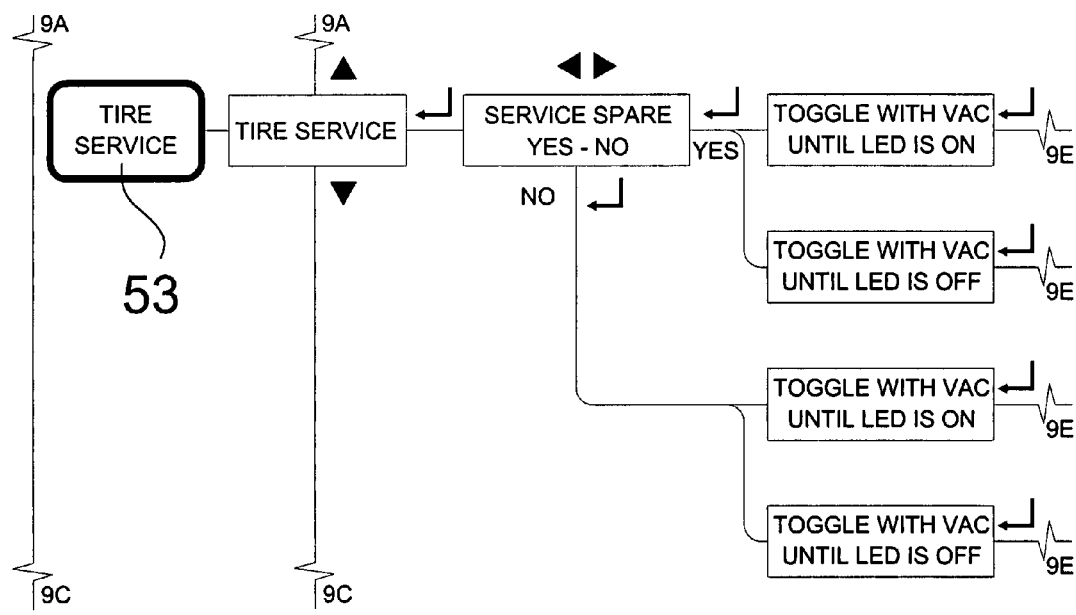
Figure 9C:
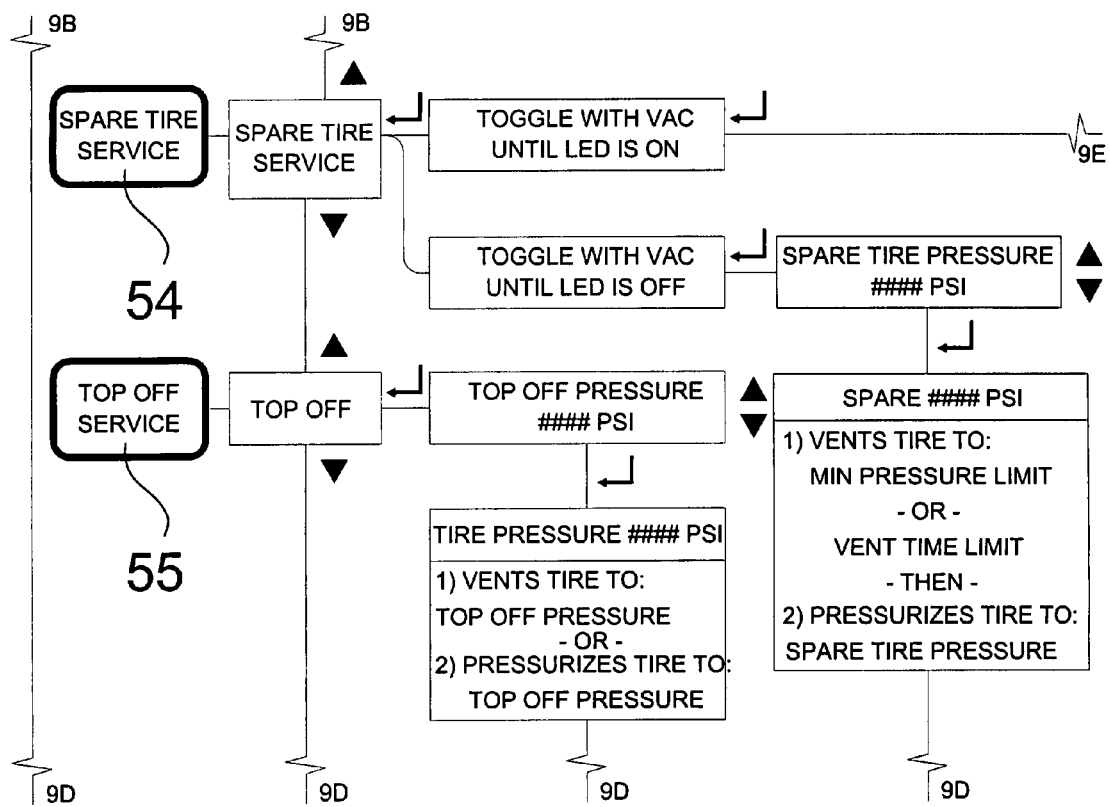
Figure 9D:
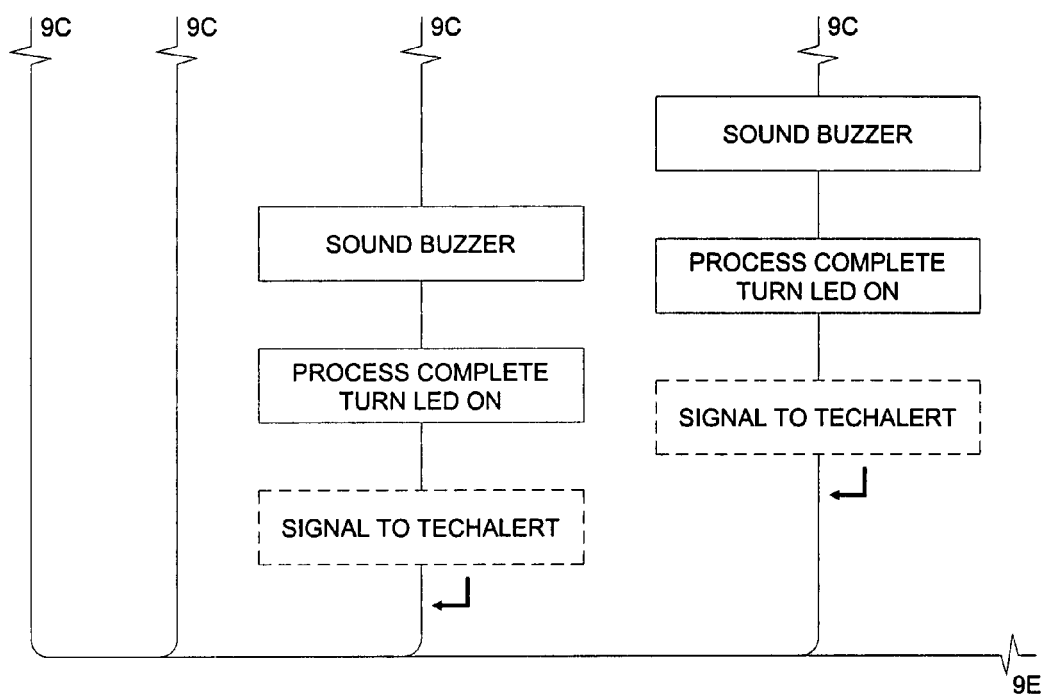
Figure 9E:
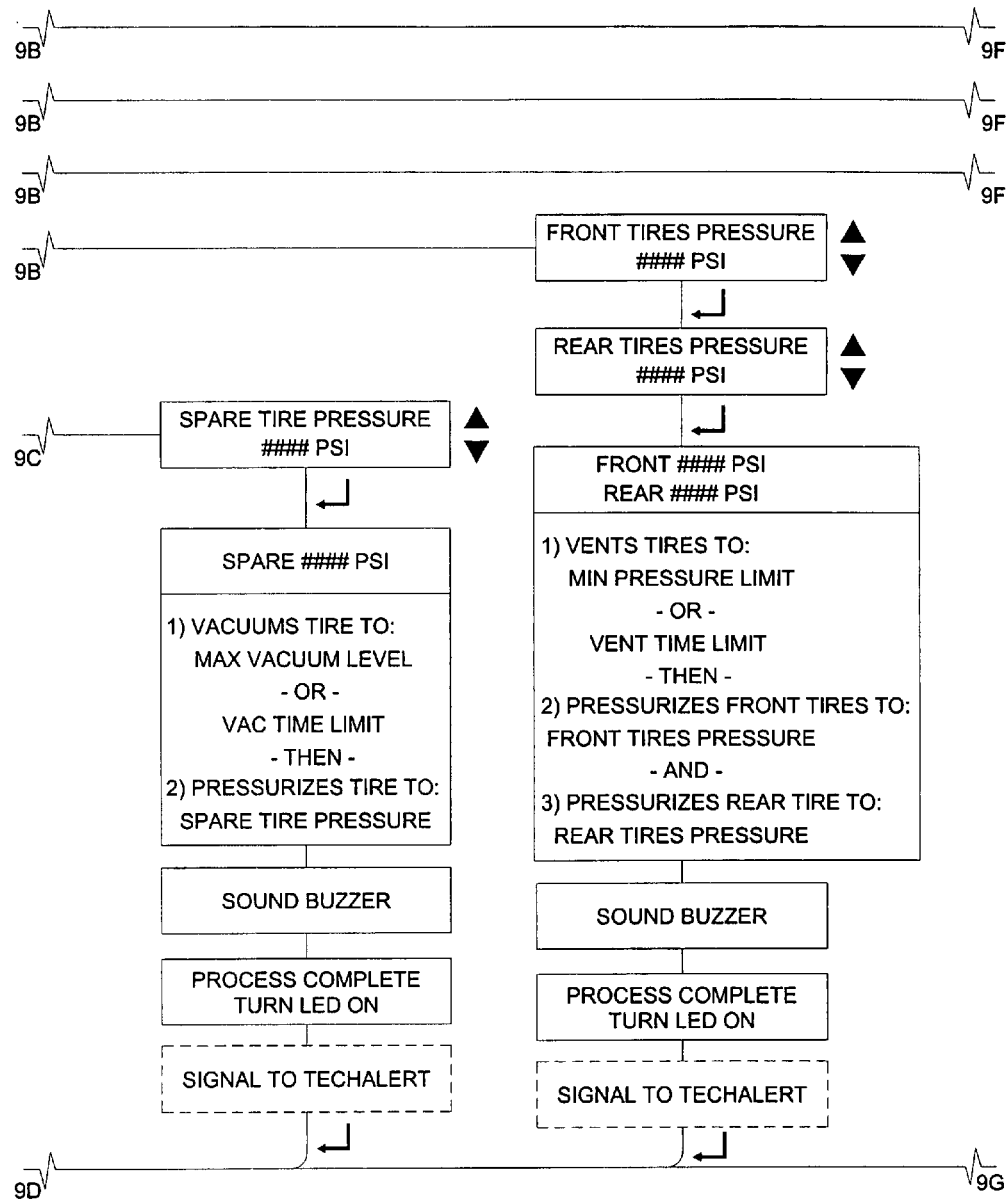
Figure 9F:
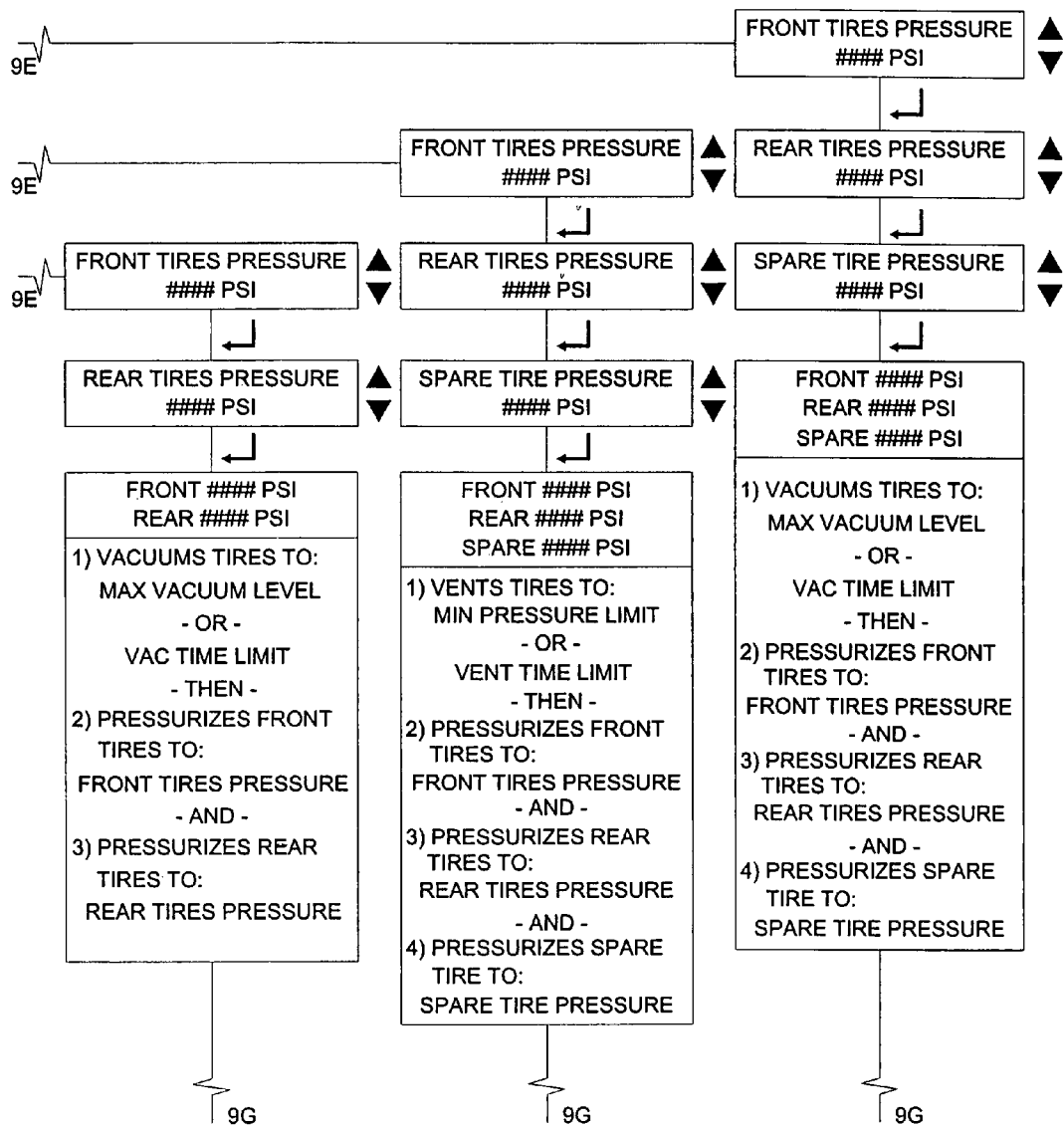
Figure 9G:
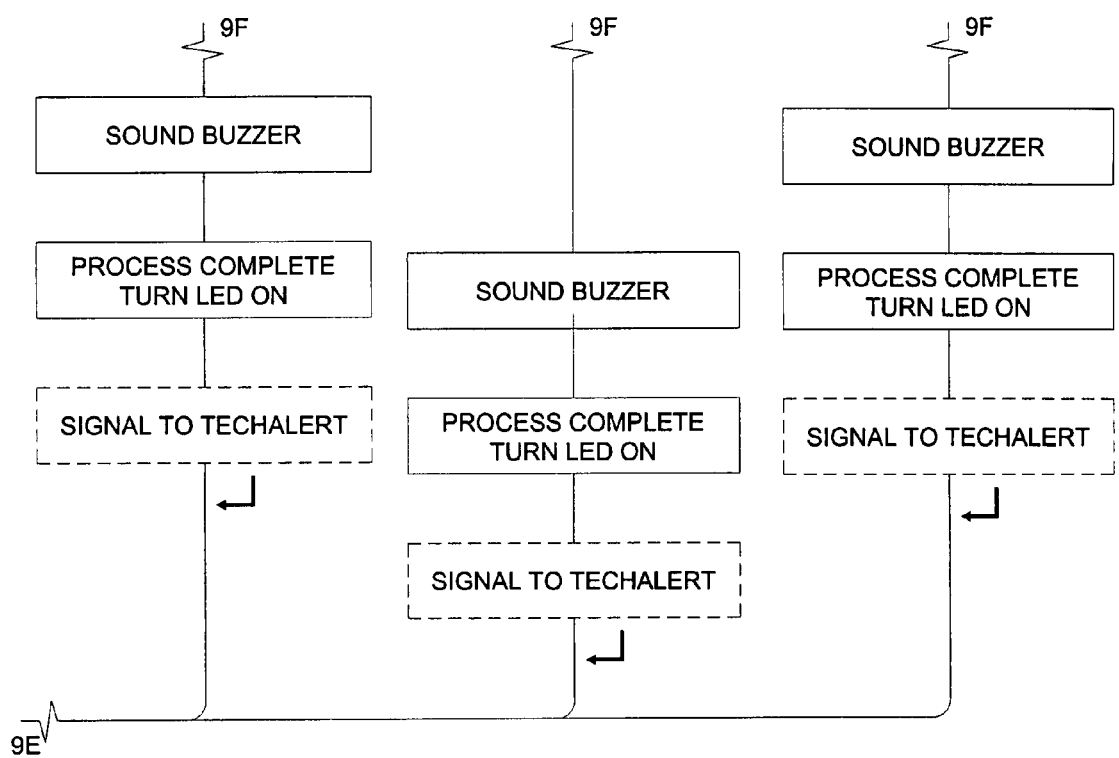

The above descriptions of tire services assume four tires; two front and two rear. A further embodiment of the invention is a five tire service where the front and rear tires are automatically serviced along with the spare tire. This service requires entering three pressures, one for front tires, one for rear tires and one for the spare tire. FIG. 7 shows the flow diagram of and, schematically illustrates this third embodiment. FIG. 8 shows the electrical schematic of the automatic nitrogen tire filling machine of FIG. 7 and FIGS. 9A-9G respectively show portions of the logic flow diagram of the five tire service embodiment. Addition of solenoid 48a and port 32a is required for the spare tire as depicted in the drawings.

Top Off

The operator connects the hose on outlet port 29 to any tire.

The display on LCD 52 is scrolled until it shows TOP OFF. The Enter pushbutton 51 is pressed to activate the routine. Or, the dedicated Top Off Service pushbutton 55 can be pressed to jump directly to this routine.

The LCD 52 displays TOP OFF PRESSURE=#### PSI. Arrow pushbuttons are pressed to increase or decrease the "####" value displayed. The value entered is the pressure that the selected tire will be at upon the completion of the Top Off procedure. The Enter pushbutton is pressed to confirm the choice.

The LCD will display TIRE PRESSURE #### PSI. The #### value will display the actual pressure in the tire as the process proceeds.

The pressure in the selected tire is checked and compared to the TOP OFF PRESSURE=#### PSI pressure value entered above.

If the pressure in the tire is not at the TOP OFF PRESSURE=#### PSI value, one of two procedures will occur; the tire will be evacuated by venting it through the apparatus to atmosphere to the correct, set tire pressure or the tire will be pressurized with nitrogen to the correct, set tire pressure.

Vent to set pressure:

Inlet solenoid 2 will be in the fill tire position and therefore not directing shop air to the venturi 25. The venturi will act as an open port.

Solenoids 43 and 45 will be activated and open which allows air from the tire to vent through the venturi from outlet port 29.

As the preset pressure level of the selected tire is approached, the process periodically pauses and a static pressure is read by the controller from pressure transducer 44.

The venting process stops when either the tire pressure is at the TOP OFF PRESSURE=#### PSI value or the time exceeds the VENT TIME LIMIT=#### SECONDS. These two limits are set during the setup routine noted previously.

Pressurize to Set Pressure:

The fill tire process starts. As the preset pressure level on the selected tire is approached, the process periodically pauses and a static pressure is read by the controller from pressure transducer 44. The fill tire process stops when the selected tire is at the pressure level set above.

When the tire is at the set pressure, the controller buzzer will sound and the process complete light on the lower left of the control panel shown in FIG. 4, will illuminate. Again, the signal from the controller which causes the buzzer to sound can instead or additionally be used as an input to initiate a signal to a portable module as described in the aforementioned, concurrently filed, commonly owned application for patent.

The operator can then disconnect the hose and apparatus from the tire and reconnect to another tire to top it off. When all tires have been topped off, the operator presses the Stop pushbutton, to the left of the display 52 in FIG. 4, to end the top off procedure.

From the above, it can be seen that the improved method and apparatus for evacuating and filling tires with high purity nitrogen of the invention enable a single tire or a plurality of tires, e.g., four or five tires, to be efficiently evacuated to a minimum pressure level, which may be a maximum vacuum level, and then filled to a set tire pressure with high purity nitrogen. Four or five tires can be simultaneously, and independently evacuated and pressurized without requiring the operator to wait with the apparatus during processing. Independent front and rear tire pressures and spare tire pressure can be set. The apparatus enables the purity of the nitrogen to be adjusted and the apparatus is portable for convenient use throughout or outside of the shop. When the operator is not waiting with the apparatus, which automatically performs the method, the remote module, referred to as TECH ALERT, will signal the operator when needed, thus permitting him to be more productive and efficient.

The above description of three example embodiments of the invention is not intended to be limiting. Various changes and modifications to the apparatus and method of the invention will occur to those skilled in the art. For example, other specialized tire filling gases other than nitrogen could be used with the apparatus in addition to or instead of the preferred nitrogen. Refillable pressurized containers for such other specialized gases would be provided. All such modifications coming within the scope of the appended claims are intended to be included therein.

We claim:

1. An apparatus for filling tires with nitrogen comprising:
   means for separating nitrogen from pressurized air;
   a container for storing pressurized nitrogen separated from pressurized air by the means for separating;
   an evacuation passage for evacuating gas from tires;
   means for creatin a vacuum in the evacuation passage;
   at least one outlet for connection with a tire;
   at least one valve selectively communicating the evacuation passage and the container with the at least one outlet for respectively evacuating gas from and nitrogen filling a tire connected to the outlet;
   a pressure sensor for sensing the pressure of gas being evacuated from and pressurized nitrogen being supplied to a tire connected to the at least one outlet;
   a controller responsive to the pressure sensed by the pressure sensor for operating at least one valve for the evacuating and nitrogen filling of a tire connected to the outlet;
   wherein during evacuating a tire, the controller is configured to stop communication of the evacuation passage with at least one outlet upon the occurrence of at least one of the sensed pressure reaching a maximum vacuum level and the time of evacuating the tire reaching a maximum time limit;
   means for adjustably presetting the maximum vacuum level;
   wherein during evacuating a tire, as the sensed pressure approaches the maximum vacuum level, the controller is configured to periodically pause the evacuating to allow a static pressure to be sensed by the pressure sensor.

2. The apparatus according to claim 1, wherein the means for creating a vacuum includes a venturi which creates a vacuum in the evacuation passage using pressurized air supplied to the venturi.

3. The apparatus according to claim 2, further comprising at least one additional valve for selectively communicating the means for separating nitrogen and the venturi with a supply of pressurized air.

4. The apparatus according to claim 2, wherein the venturi acts as a vent to atmosphere for pressurized gas in the evacuation passage when pressurized air is not supplied to the venturi.

5. The apparatus according to claim 1, wherein said means for adjustably presetting the maximum vacuum level includes a data entry terminal permitting entry of a pressure to set the maximum vacuum level and a time limit to set the maximum time limit, the controller receiving data from the data entry.

6. The apparatus according to claim 1, wherein during nitrogen filling a tire, the controller is configured to stop communication of the container with at least one outlet at a set tire pressure.

7. The apparatus according to claim 6, wherein during nitrogen filling a tire, as the sensed pressure approaches the set tire pressure, the controller is configured to periodically pause the nitrogen filling to allow a static pressure to be sensed by the pressure sensor.

8. The apparatus according to claim 6, further comprising a data entry terminal permitting entry of a pressure as a set tire pressure, the controller receiving data from the data entry.

9. An apparatus according to claim 1, further comprising a plurality of outlets for connection with respective ones of a plurality of tires, and a plurality of valves operable by the controller for selectively communicating the container and the evacuation passage with respective ones of the plurality of outlets for respectively evacuating gas from and nitrogen filling tires connected to the outlets.

10. The apparatus according to claim 9, wherein the controller operates the valves for simultaneously evacuating and simultaneously nitrogen filling a plurality of tires connected to the outlets.

11. The apparatus according to claim 10, wherein when simultaneously evacuating a plurality of tires, as the sensed pressure approaches a minimum pressure level, the controller is configured to stop communication of the evacuation passage with each of the plurality of outlets, each outlet then being sequentially communicated with the evacuation passage to allow pressure sensing at the corresponding outlet and evacuating of the tire connected to the outlet to a minimum pressure level.

12. The apparatus according to claim 10, wherein when simultaneously nitrogen filling a plurality of tires, as the sensed pressure approaches a set tire pressure, the controller is configured to stop communication of the container with each of the plurality of outlets, each outlet then being sequentially communicated with the container to allow pressure sensing at the corresponding outlet and nitrogen filling of the tire connected to the outlet to a set tire pressure.

13. The apparatus according to claim 9, further comprising a data entry terminal permitting entry of a pressure as a set tire pressure for front tires and entry of a pressure as a set tire pressure for rear tires, the controller receiving data from the data entry.

* * * * *